United States Patent
McNutt

(10) Patent No.: US 9,659,686 B1
(45) Date of Patent: May 23, 2017

(54) COMMUNICATION CABLES INCORPORATING TWISTED PAIR SEPARATORS THAT FUNCTION AS SHIELDS

(71) Applicant: Superior Essex International LP, Atlanta, GA (US)

(72) Inventor: Christopher W. McNutt, Woodstock, GA (US)

(73) Assignee: Superior Essex International LP, Atlanta, GA (US)

( * ) Notice: Subject to any disclaimer, the term of this patent is extended or adjusted under 35 U.S.C. 154(b) by 0 days.

(21) Appl. No.: 14/742,147

(22) Filed: Jun. 17, 2015

(51) Int. Cl.
 H01B 11/04 (2006.01)
 H01B 11/08 (2006.01)
 H01B 11/10 (2006.01)

(52) U.S. Cl.
 CPC ............ *H01B 11/08* (2013.01); *H01B 11/10* (2013.01)

(58) Field of Classification Search
 CPC .......... H01B 11/04; H01B 11/06; H01B 11/08
 USPC .............................. 174/113 R, 113 C, 36, 27
 See application file for complete search history.

(56) References Cited

U.S. PATENT DOCUMENTS

| | | | |
|---|---|---|---|
| 1,883,269 A | 10/1932 | Yonkers | |
| 4,323,721 A * | 4/1982 | Kincaid | H01B 11/06 174/103 |
| 6,506,976 B1 | 1/2003 | Neveux | |
| 7,214,883 B2 | 5/2007 | Leyendecker | |
| 7,999,184 B2 | 8/2011 | Wiebelhaus et al. | |
| 9,136,043 B2 * | 9/2015 | Brown | H01B 11/06 |
| 9,275,776 B1 * | 3/2016 | McNut | H01B 11/1008 |
| 9,316,801 B1 * | 4/2016 | Kithuka | G02B 6/4495 |
| 2012/0301089 A1 | 11/2012 | Camp et al. | |
| 2013/0014972 A1 | 1/2013 | Wiebelhaus | |
| 2014/0251652 A1 | 9/2014 | Poulsen et al. | |

OTHER PUBLICATIONS

Office Action mailed on Oct. 23, 2014 for U.S. Appl. No. 13/917,164.
Office Action mailed on Jan. 15, 2015 for U.S. Appl. No. 14/057,242.
Office Action mailed on May 21, 2015 for U.S. Appl. No. 13/917,164.

* cited by examiner

*Primary Examiner* — Chau N Nguyen

(57) ABSTRACT

Cables incorporating twisted pair separators that function as shields are describes. A cable may include one or more twisted pairs of individually insulated conductors. A respective separator may be associated with at least one of the twisted pairs. The separator may include a dielectric portion positioned between the conductors of the twisted pair and at least one shielding portion that includes electrically conductive material. The shielding portion may extending from the dielectric portion to form a shield around an outer circumference of the twisted pair. Additionally, the cable may include a jacket formed around the twisted pair and the separator.

20 Claims, 14 Drawing Sheets

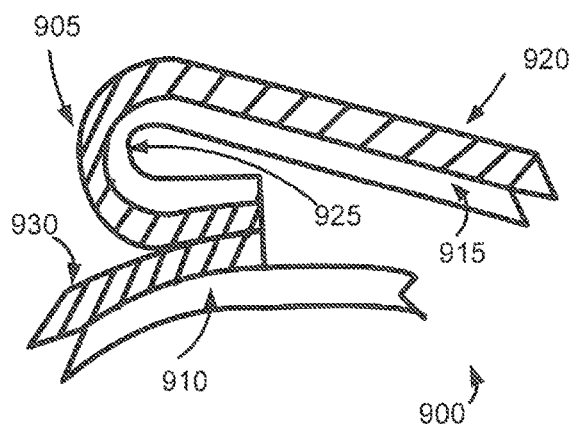
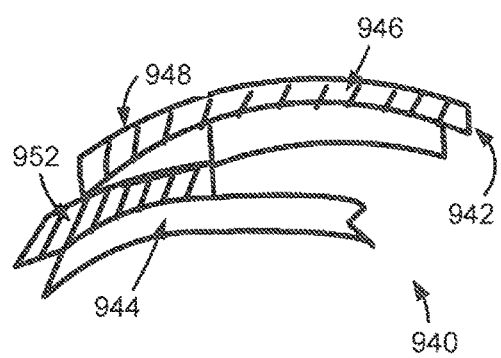
FIG. 9A
FIG. 9B
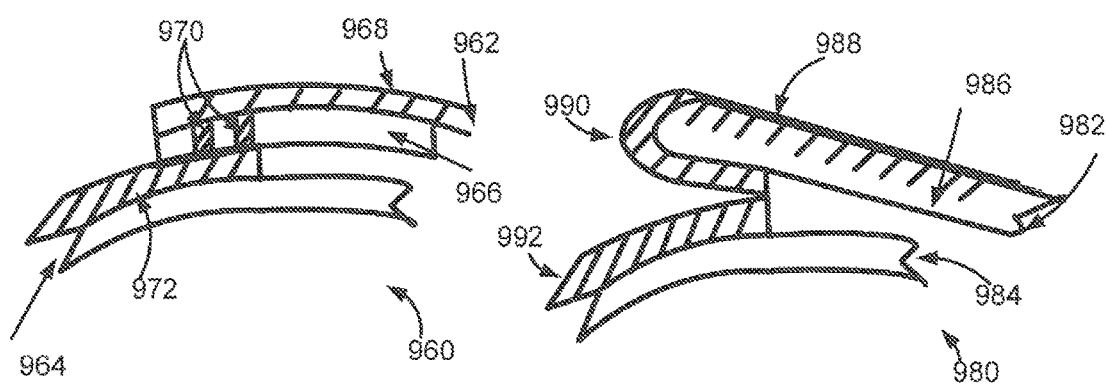
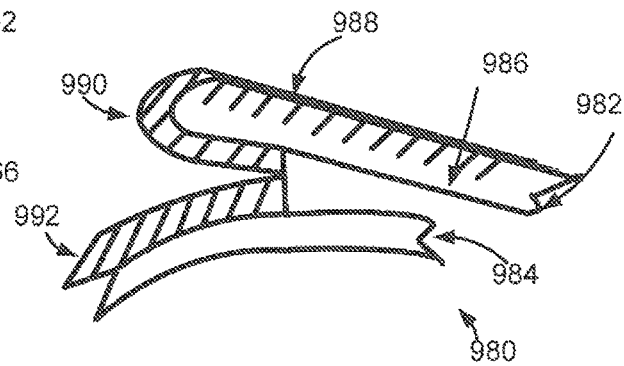
FIG. 9C
FIG. 9D

COMMUNICATION CABLES INCORPORATING TWISTED PAIR SEPARATORS THAT FUNCTION AS SHIELDS

CROSS-REFERENCES TO RELATED APPLICATIONS

This application is related to pending U.S. patent application Ser. No. 14/057,242, filed Oct. 18, 2013 and entitled "Communication Cables Incorporating Twisted Pair Separators" and pending U.S. patent application Ser. No. 13/917,164, filed Jun. 13, 2013 and entitled "Shielded Twisted Pair Communication Cables". The respective contents of each of these matters is incorporated herein by reference in its entirety.

TECHNICAL FIELD

Embodiments of the disclosure relate generally to communication cables and, more particularly, to twisted pair communication cables incorporating one or more dielectric separators positioned between the conductors of one or more twisted pairs that additionally function a shields for the one or more twisted pairs.

BACKGROUND

A wide variety of different types of communication cables and composite cables incorporate twisted pair conductors. In twisted pair cables, signal performance may be degraded due to a wide variety of factors, including signal attenuation and crosstalk. Crosstalk typically occurs when a signal transmitted on one channel (e.g., a first twisted pair) creates an undesired effect in another channel (e.g., a second twisted pair). Crosstalk is usually caused by undesired capacitive, inductive, or conductive coupling from one channel to another. In certain conventional cables, such as cables described in U.S. Pat. No. 6,506,976 and U.S. Pat. Pub. No. 2013/0014972, dielectric films have been positioned between the individual conductors of twisted pairs in an attempt to reduce crosstalk.

Additionally, many cable constructions incorporate shielding in order to limit interference on the twisted pairs, including crosstalk between twisted pairs and external interference. In some cables, individual shields are provided for twisted pairs. However, because individual shields are constructed as separate elements around a twisted pair, the shields may move or shift relative to the twisted pair conductors, leading to degraded performance. There is also potential for the shields to become unwrapped, which may also result in degraded electrical performance. Accordingly, there is an opportunity for improved twisted pair cables that incorporate components that serve both as dielectric separators between the conductors of a twisted pair and as shields for the twisted pairs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

FIGS. 9A-9D are cross-sectional depictions of example techniques for circumferentially shorting electrically conductive material, according to an illustrative embodiments of the disclosure.

DETAILED DESCRIPTION

Various embodiments of the present disclosure are directed to twisted pair separator components for use in cables, such as twisted pair communication cables and/or other composite or hybrid cables that incorporate twisted pairs. Other embodiments are directed to cables incorporating these twisted pair separator components. An example cable may include one or more twisted pairs of conductors positioned or situated within a cable core or opening defined by a cable jacket. Additionally, one or more suitable twisted pair separator component may be incorporated into the cable in association with one or more respective twisted pairs.

Each twisted pair separator may include a first portion that is positioned between the conductors of a twisted pair and one or more second portions that form a shield around an outer circumference of the twisted pair. The first portion may be formed from one or more suitable dielectric materials. The second portion(s) may extend from the first portion, and the second portion(s) may include electrically conductive material. When wrapped around the twisted pair, the electrically conductive material may perform a shielding function. In other words, the second portion(s) may form an individual pair shield around the conductors of the twisted pair.

For purposes of this disclosure, the terms "twisted pair separator", "dielectric separator", "composite separator", and "separator" may be utilized to refer to a cable component that is capable of functioning as both a dielectric separator between the conductors of a twisted pair and as a shield formed around the twisted pair. A twisted pair cable may also include a separator positioned between two or more twisted pairs of a cable. A separator positioned between twisted pairs should not be confused with a separator that is positioned between or results in separation between the individual conductors of a twisted pair.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Example Cable Constructions

Figure 1:
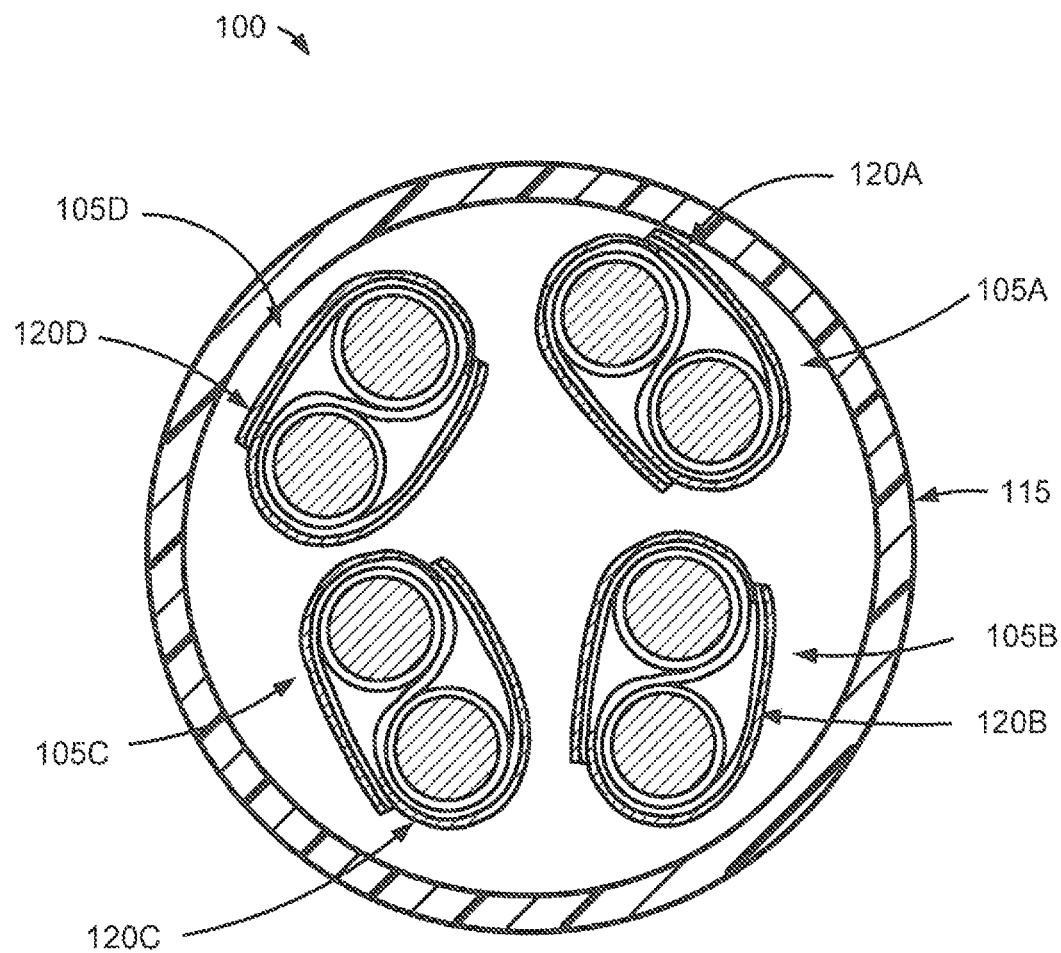
FIG. 1 is a cross-sectional view of an example cable including twisted pair separators that additionally function as shields, according to an illustrative embodiment of the disclosure.

With reference to FIG. 1, a cross-section of an example cable 100 that may be utilized in various embodiments is illustrated. The cable 100 is illustrated as a twisted pair communications cable; however, other types of cables may be utilized, such as composite or hybrid cables that include a combination of twisted pairs and other transmission media (e.g., optical fibers, etc.). Indeed, suitable cables may include any number of transmission media including but not limited to one or more twisted pairs, optical fibers, coaxial cables, and/or power conductors. Additionally, embodiments of the disclosure may be utilized in association with horizontal cables, vertical cables, flexible cables, equipment cords, cross-connect cords, plenum cables, riser cables, or any other appropriate cables.

As shown in FIG. 1, the cable 100 may include four twisted pairs 105A, 105B, 105C, 105D; however, any other suitable number of pairs may be utilized. As desired, the twisted pairs 105A-D may be twisted or bundled together and/or suitable bindings may be wrapped around the twisted pairs 105A-D. In other embodiments, multiple grouping of twisted pairs may be incorporated into a cable. As desired, each grouping may be twisted, bundled, and/or bound together. Further, in certain embodiments, the multiple groupings may be twisted, bundled, or bound together.

Each twisted pair (referred to generally as twisted pair 105 or collectively as twisted pairs 105) may include two electrical conductors, each covered with suitable insulation. As desired, each of the twisted pairs may have the same twist lay length or alternatively, at least two of the twisted pairs may include a different twist lay length. For example, each twisted pair may have a different twist rate. The different twist lay lengths may function to reduce crosstalk between the twisted pairs. A wide variety of suitable twist lay length configurations may be utilized. In certain embodiments, the differences between twist rates of twisted pairs 105 that are circumferentially adjacent one another (for example the twisted pair 105A and the twisted pair 105B) may be greater than the differences between twist rates of twisted pairs 105 that are diagonal from one another (for example the twisted pair 105A and the twisted pair 105C). As a result of having similar twist rates, the twisted pairs that are diagonally disposed can be more susceptible to crosstalk issues than the twisted pairs 105 that are circumferentially adjacent; however, the distance between the diagonally disposed pairs may limit the crosstalk. Thus, the different twist lengths and arrangements of the pairs can help reduce crosstalk among the twisted pairs 105.

Additionally, in certain embodiments, each of the twisted pairs 105A-D may be twisted in the same direction (e.g., clockwise, counter clockwise). In other embodiments, at least two of the twisted pairs 105A-D may be twisted in opposite directions. Further, as desired in various embodiments, one or more of the twisted pairs 105A-D may be twisted in the same direction as an overall bunch lay of the combined twisted pairs. For example, the conductors of each of the twisted pairs 105A-D may be twisted together in a given direction. The plurality of twisted pairs 105A-D may then be twisted together in the same direction as each of the individual pair's conductors. In other embodiments, at least one of the twisted pairs 105A-D may have a pair twist direction that is opposite that of the overall bunch lay. In yet other embodiments, all of the twisted pairs 105A-D may have pair twist directions that are opposite that of the overall bunch lay.

The electrical conductors of a twisted pair 105 may be formed from any suitable electrically conductive material, such as copper, aluminum, silver, annealed copper, gold, a conductive alloy, etc. Additionally, the electrical conductors may have any suitable diameter, gauge, and/or other dimensions. Further, each of the electrical conductors may be formed as either a solid conductor or as a conductor that includes a plurality of conductive strands that are twisted together.

The twisted pair insulation may include any suitable dielectric materials and/or combination of materials, such as one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. Additionally, in certain embodiments, the insulation of each of the electrical conductors utilized in the twisted pairs 105A-D may be formed from similar materials. In other embodiments, at least two of the twisted pairs may utilize different insulation materials. For example, a first twisted pair may utilize an FEP insulation while a second twisted pair utilizes a non-FEP polymeric insulation. In yet other embodiments, the two conductors that make up a twisted pair may utilize different insulation materials.

In certain embodiments, the insulation may be formed from multiple layers of one or a plurality of suitable materials. In other embodiments, the insulation may be formed from one or more layers of foamed material. As desired, different foaming levels may be utilized for different twisted pairs in accordance with twist lay length to result in insulated twisted pairs having an equivalent or approximately equivalent overall diameter. In certain embodiments, the different foaming levels may also assist in balancing propagation delays between the twisted pairs. As desired, the insulation may additionally include other materials, such as a flame retardant materials, smoke suppressant materials, etc.

Each twisted pair 105 can carry data or some other form of information, for example in a range of about one to ten Giga bits per second ("Gbps") or another appropriate frequency, whether faster or slower. In certain embodiments, each twisted pair 105 supports data transmission of about two and one-half Gbps (e.g. nominally two and one-half Gbps), with the cable 100 supporting about ten Gbps (e.g. nominally ten Gbps). In certain embodiments, each twisted pair 105 supports data transmission of up to about ten Gbps (e.g. nominally ten Gbps), with the cable 100 supporting about forty Gbps (e.g. nominally forty Gbps).

With continued reference to FIG. 1, a jacket 115 may enclose the internal components of the cable 100, seal the cable 100 from the environment, and/or provide strength and structural support. The jacket 115 may be formed from a wide variety of suitable materials and/or combinations of materials, such as one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. The jacket 115 may be formed as a single layer or, alternatively, as multiple layers. In certain embodiments, the jacket 115 may be formed from one or more layers of foamed material. As desired, the jacket 115 can include flame retardant and/or smoke suppressant materials. The jacket 115 may be formed to result in a round cable or a cable having an approximately circular cross-section; however, the jacket 115 and internal components may be formed to result in other desired shapes, such as an elliptical, oval, or rectangular shape. The jacket 115 may also have a wide variety of suitable dimensions, such as any suitable or desirable outer diameter and/or any suitable or desirable wall thickness. In various embodiments, the jacket 115 can be characterized as an outer jacket, an outer sheath, a casing, a circumferential cover, or a shell.

An opening enclosed by the jacket 115 may be referred to as a cable core, and the twisted pairs 105A-D may be disposed within the cable core 125. Although a single cable core is illustrated in the cable 100 of FIG. 1, a cable may be formed to include multiple cable cores. In certain embodiments, the cable core may be filled with a gas such as air (as illustrated) or alternatively a gelatinous, solid, powder, moisture absorbing material, water-swellable substance, dry filling compound, or foam material, for example in interstitial spaces between the twisted pairs 105A-D. Other elements can be added to the cable core as desired, for example one or more optical fibers, additional electrical conductors, additional twisted pairs, water absorbing materials, and/or strength members, depending upon application goals.

According to an aspect of the disclosure, one or more twisted pair separators may be incorporated into the cable 100. Each twisted pair separator may be associated with a respective twisted pair. As shown in FIG. 1, a first twisted pair separator 120A may be associated with a first twisted pair 105A, a second twisted pair separator 120B may be associated with a second twisted pair 105B, a third twisted pair separator 120C may be associated with a third twisted pair 105C, and a fourth twisted pair separator 120D may be associated with a fourth twisted pair 105D. Other cable constructions may include more or less twisted pair separators than that illustrated in FIG. 1. Additionally, although FIG. 1 illustrates a twisted pair separator in association with each of the twisted pairs, in other embodiments, only a portion of the twisted pairs may include an associated separator. Further, FIG. 1 illustrates twisted pair separators 120A-D that have similar constructions. In other embodiments, at least two twisted pair separators may be formed utilizing different materials, configurations, and/or constructions.

Each twisted pair separator (generally referred to as separator 120) may be woven helically with the individual conductors or conductive elements of an associated twisted pair 105. In other words, a separator 120 may be helically twisted with the conductors of a twisted pair 105 along a longitudinal length of the cable 100. Additionally, each separator 120 may include a first portion that is positioned between the conductors of a twisted pair 105 and one or more second portions that form a shield around an outer circumference of the twisted pair. The first portion may be helically twisted between the conductors, and the second portion may be helically twisted around the conductors as the separator 120 and the pair 105 are twisted together.

In certain embodiments, the first portion or dielectric portion may assist in maintaining spacing between the individual conductors of the twisted pair 105. In certain cases, the presence and positioning of the first portion may permit the thickness of the conductor insulation to be reduced relative to conventional twisted pairs. Additionally, in certain embodiments, the separator 120 may assist in maintaining the positions of one or both of the individual conductors. As explained in greater detail below, a first portion of a separator 120 may be formed with a wide variety of suitable cross-sectional shapes and/or from a wide variety of materials. Certain embodiments of the separator 120 may reduce or limit the ability of one or both of the twisted pair conductors to shift, slide, or otherwise move in the event that certain forces, such as compressive forces, are exerted on the cable 100. Additionally, the shielding portion (s) of separator 120 may assist in maintaining the positions of one or both of the individual conductors.

As desired, the first portion may be formed from or formed substantially from one or more dielectric materials. A wide variety of suitable dielectric materials may be utilized including, but not limited to, paper, various plastics, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, polytetrafluoroethylene, ethylene tetrafluoroethylene ("ETFE"), ethylene chlorotrifluoroethylene ("ECTFE"), etc.), one or more polyesters, polyimide, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or any other suitable material or combination of materials. As desired, one or more foamed materials may be utilized to form the first portion. Indeed, the first portion may be filled, unfilled, foamed, un-foamed, homogeneous, or inhomogeneous and may or may not include one or more additives (e.g., flame retardant and/or smoke suppressant materials).

A wide variety of suitable techniques and/or processes may be utilized to form a first portion. For example, a dielectric material may be extruded, poltruded, or otherwise formed. As desired, the dielectric material layer may have a substantially uniform composition, may be made of a wide range of materials, and/or may be fabricated in a single manufacturing pass. Further, the dielectric material may be foamed, may be a composite, and may include one or more strength members, fibers, threads, or yarns. Additionally, as desired, the dielectric material may be hollow and/or include any number of longitudinally extending cavities that may optionally be filled with air or some other gas, gel, fluid, moisture absorbent, water-swellable substance, dry filling compound, powder, one or more optical fibers, one or more metallic conductors (e.g., a drain wire, etc.), shielding, or some other appropriate material or element.

Additionally, as explained in greater detail below with reference to FIGS. 3A-5F, the first portion may be formed with a wide variety of suitable constructions and/or dimensions. For example, the first portion may be formed from a relatively flat dielectric tape that is positioned between the conductors of a twisted pair 105. As another example, the first portion may be formed from a foamed material positioned between the conductors of a twisted pair 105. As yet another example, the first portion may be formed from a tape that is folded into a structure with desired cross-sectional shape, such as an H-shape, an X-shape, etc. As yet another example, the first portion may be formed from one or more materials that are extruded, poltruded, or molded into a structure with a desired cross-sectional shape, such as an H-shape, an X-shape, etc. Additionally, in certain embodiments, the first portion may be formed from a single layer of material. In other embodiments, the first portion may be formed from a plurality of layers of material. The layers may be formed from the same materials or, alternatively, at least two layers may be formed from different materials. Although a few example constructions are illustrated in FIGS. 3A-5F, a wide variety of other constructions may be utilized. The first portion or various subcomponents of the first portion may have a wide variety of suitable dimensions.

As desired in various embodiments, any number of second portions or shield portions may extend from the first portion, and the second portion(s) may include electrically conductive material. When wrapped around the twisted pair 105, the electrically conductive may perform a shielding function. In other words, the second portion(s) may form an individual pair shield around the conductors of the twisted pair. As shown in the separators 120A-D of FIG. 1, two second portions respectively extend from opposite ends of the first portion. These second portions are wrapped around the conductors of a twisted pair 105 until they contact one another. In other embodiments, a single second portion may extend from one end of the first portion, and the second portion may be wrapped around the outer periphery of the twisted pair. In yet other embodiments, more than two second portions may extend from a first portion. Indeed, various constructions of the first portion permit the use of a wide variety of different numbers of second portions.

As set forth in greater detail below with reference to FIGS. 3A-5F, a second portion may be formed with a wide variety of suitable constructions and/or dimensions. Additionally, a second portion may be constructed or formed from a wide variety of suitable materials and/or combinations of materials. According to an aspect of the disclosure, each second portion may include one or more patches of electrically conductive material formed on or incorporated into a suitable dielectric base layer or base material. Examples of suitable electrically conductive materials that may be incorporated into a second portion include, but are not limited to, metallic materials (e.g., silver, copper, nickel, steel, iron, annealed copper, gold, aluminum, etc.), metallic alloys, conductive composite materials, etc. Indeed, suitable electrically conductive materials may include any material having an electrical resistivity of less than approximately $1\times10^{-7}$ ohm meters at approximately 20° C. In certain embodiments, an electrically conductive material may have an electrical resistivity of less than approximately $3\times10^{-8}$ ohm meters at approximately 20° C.

Examples of suitable materials that may be used to form a dielectric base layer or base material include, but are not limited to, various plastics, one or more polymeric materials, one or more polyolefins (e.g., polyethylene, polypropylene, etc.), one or more fluoropolymers (e.g., fluorinated ethylene propylene ("FEP"), polyester, polytetrafluoroethylene, polyimide, or some other polymer, combination of polymers, or dielectric material(s) that does not ordinarily conduct electricity. As desired, one or more foamed materials may be utilized to form a dielectric base layer. Indeed, a base layer of a second portion may be filled, unfilled, foamed, unfoamed, homogeneous, or inhomogeneous and may or may not include one or more additives (e.g., flame retardant and/or smoke suppressant materials).

A wide variety of suitable techniques and/or processes may be utilized to form a second portion. For example, a base material or dielectric material may be extruded, poltruded, or otherwise formed. As desired, the base layer may have a substantially uniform composition, may be made of a wide range of materials, and/or may be fabricated in a single manufacturing pass. Further, the base layer may be foamed, may be a composite, and may include one or more strength members, fibers, threads, or yarns. Additionally, as desired, the base layer may be hollow and/or include any number of longitudinally extending cavities that may optionally be filled with air or some other gas, gel, fluid, moisture absorbent, water-swellable substance, dry filling compound, powder, one or more optical fibers, one or more metallic conductors (e.g., a drain wire, etc.), shielding, or some other appropriate material or element.

In certain embodiments, a separate dielectric base layer and one or more electrically conductive layers may be bonded, adhered, or otherwise joined (e.g., glued, etc.) together. In other embodiments, electrically conductive material may be formed on a dielectric base layer or injected into a dielectric base material via any number of suitable techniques, such as the application of metallic ink or paint, liquid metal deposition, vapor deposition, welding, heat fusion, adherence of patches to the dielectric, or etching of patches from a metallic sheet. In certain embodiments, conductive patches can be over-coated with an electrically insulating film or another dielectric layer. Additionally, in certain embodiments, one or more electrically conductive layers may be sandwiched between two dielectric layers. Indeed, any number of suitable layers of material may be utilized to form a second portion.

It will be appreciated that a second portion of a separator 120 may function as a shield layer or a shielding component. Accordingly, the discussion set forth below with reference to shielding components such as shield layers and/or separators positioned between two or more twisted pairs is equally applicable to a second portion of a separator 120. Indeed, a second portion may be formed with a wide variety of suitable constructions. A second portion may also have a wide variety of suitable patch configurations and/or arrangements. A few example patch configurations are discussed in greater detail below with reference to FIGS. 7A-7D. Additionally, as explained in greater detail below and as illustrated in FIGS. 9A-9D, in certain embodiments, one or more patches formed on a second portion or on a plurality of second portions may be electrically shorted in a circumferential direction. Such circumferential shorting may assist in limiting electrical perturbations that might negatively impact the electrical performance of the twisted pair conductors.

In certain embodiments, one or more layers incorporated into a first portion may extend into one or more second portions. For example, the first portion may include a dielectric layer that extends into one or more second portions. One or more electrically conductive patches included in the second portion(s) may then be formed on the dielectric layer. In other embodiments, a first portion and one or more second portions may be separately formed as discrete components. The one or more second portions may then be attached to the first portion. In certain embodiments, dielectric components of the first portion and at least one second portion may be formed from the same or similar materials. In other embodiments, the first portion and at least one second portion may be formed from separate materials.

In the event that a first portion and a second portion are formed as distinct components, a wide variety of suitable methods or techniques may be utilized to connect or attach the second portion to the first portion. For example, a second portion may be bonded to the first portion via a suitable adhesive (e.g. a contact adhesive, a pressure sensitive adhesive, a hot melt adhesive, etc.). As another example, a second portion may be attached to the first portion via one or more suitable mechanical fasteners, such as pins, screws, threaded fasteners, rivets, clips, etc.

The cable 100 of FIG. 1 illustrates separators 120A-D in which the second portions are in relatively close proximity to the conductors of an associated twisted pair. In other words, each second portion is wrapped around the outer periphery of a twisted pair conductor with substantially no gap or space between the second portion and conductor insulation. As a result, a spacing between the twisted pair conductors and electrically conductive material included on the second portion is limited to a combined thickness of the second portion base layer and the conductor insulation. In other embodiments, it may be desirable to maintain a relatively greater spacing or gap between the electrically conductive patches and the twisted pair conductors. As discussed in greater detail below with reference to FIGS. 3A-5F, a wide variety of suitable constructions and/or techniques may be utilized to attain any desired spacing between the electrically conductive patches and the twisted pair conductors. For example, in certain embodiments, one or more layers of a second portion may be formed from a foamed material that provides a desired spacing. As another example, in certain embodiments, a base layer of a second portion may be thicker than a first portion. In other embodiments, one or more protrusions may extend from an underside of a second portion in order to maintain a desired spacing. A wide variety of other suitable techniques may be utilized to maintain a desired spacing, and the techniques discussed herein are provided by way of example only.

In certain embodiments, a twisted pair separator 120 may be formed as a relatively continuous separator along a longitudinal length of the cable. In other words, the separator 120 may be formed from a single segment or portion. In other embodiments, a separator 120 may be formed from a plurality of discrete segments or portions. For example, discrete segments or portions may be positioned adjacent to one another along a longitudinal length of the separator 120. In certain embodiments, gaps or spaces may be present between various segments or portions of the separator 120. In other embodiments, at least a portion of the segments may be arranged in an overlapping configuration. For example, as explained in greater detail below with reference to FIGS. 10 and 11, adjacent segments may overlap one another at shared longitudinal edges.

Figure 2:
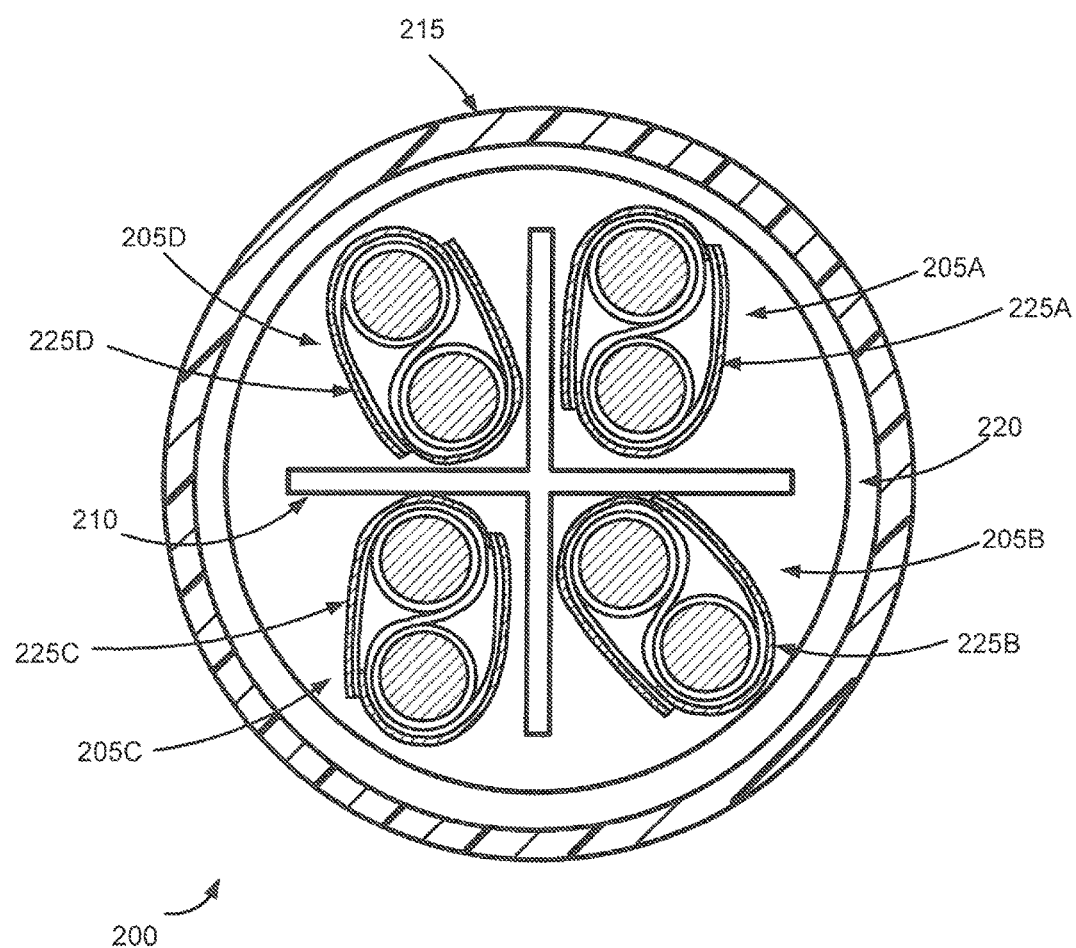
FIG. 2 is a cross-sectional view of another example cable including twisted pair separators that additionally function as shields, according to an illustrative embodiment of the disclosure.

With continued reference to FIG. 1, a wide variety of other components may be incorporated into the cable 100. For example, as illustrated in FIG. 2, one or more additional shield layers, such as an external shield, may be incorporated into a cable. Additionally, as desired, one or more separators or splines may be positioned between two or more twisted pairs (rather than between the individual conductors of a twisted pair). FIG. 2 is a cross-sectional view of another example cable 200 including twisted pair separators that additionally function as shields, according to an illustrative embodiment of the disclosure. The cable 200 of FIG. 2 may include components that are similar to the cable 100 illustrated and described above with reference to FIG. 1. Accordingly, the cable 200 may include a plurality of twisted pairs 205A-D disposed in a cable core defined by an outer jacket 215. Additionally, a respective twisted pair separator 225A-D may be provided for each of the twisted pairs 205A-D. In contrast to the cable 100 depicted in FIG. 1, the cable 200 of FIG. 2 may additionally include a separator 210 disposed between at least two of the twisted pairs 205A-D and a shield layer 220 formed around the twisted pairs 205A-D.

In addition to the twisted pair separators 120A-D, 225A-D that provide a shielding function for individual twisted pairs, a cable 100, 200 may additionally include any number of other suitable shield layers. For example, as illustrated in FIG. 2, a cable 200 may include an external shield layer, such as shield 220. The external shield layer 220 may be formed around the collective group of twisted pairs 205A-D incorporated into the cable 200. In other embodiments, one or more respective shield layers may be provided for desired subgroups of twisted pairs. In certain embodiments, a shield layer may be positioned within a cable core. In other embodiments, a shield layer, such as the external shield layer 220, may be incorporated into the outer jacket 215. For example, the shield layer 220 may be sandwiched between two other layers of outer jacket material, such as two dielectric layers. As another example, electrically conductive material may be injected or inserted into the outer jacket 215 or, alternatively, the outer jacket 215 may be impregnated with electrically conductive material. A wide variety of other suitable shielding arrangements may be utilized as desired in other embodiments. Further, in certain embodiments, a cable may include a separate, armor layer (e.g., a corrugated armor, etc.) for providing mechanical protection.

The external shield 220 will now be described herein in greater detail; however, it will be appreciated that other shield layers may have similar constructions. In certain embodiments, a shield 220 may be formed from a single segment or portion that extends along a longitudinal length of the cable 200. In other embodiments, a shield 220 may be formed from a plurality of discrete segments or portions positioned adjacent to one another along a longitudinal length of the cable 200. In the event that discrete segments or portions are utilized, in certain embodiments, gaps or spaces may exist between adjacent segments or portions. In other embodiments, certain segments may overlap one another. For example, an overlap may be formed between segments positioned adjacent to one another along a longitudinal length of the cable.

As desired, a wide variety of suitable techniques and/or processes may be utilized to form a shield 220 (or a shield segment). As one example, a base material or dielectric material may be extruded, poltruded, or otherwise formed. Electrically conductive material may then be applied to the base material. In other embodiments, electrically conductive material may be injected into the base material. In other embodiments, dielectric material may be formed or extruded over electrically conductive material in order to form a shield 220. Indeed, a wide variety of suitable techniques may be utilized to incorporate electrically conductive material into a shield 220. In certain embodiments, the base layer may have a substantially uniform composition and/or may be made of a wide range of materials. Additionally, the base layer may be fabricated in any number of manufacturing passes, such as a single manufacturing pass. Further, the base layer may be foamed, may be a composite, and/or may include one or more strength members, fibers, threads, or yarns. As desired, flame retardant material, smoke suppressants, and/or other desired substances may be blended or incorporated into the base layer.

In certain embodiments, the shield 220 (or individual shield segments) may be formed as a tape that includes both a dielectric layer and an electrically conductive layer (e.g., copper, aluminum, silver, an alloy, etc.) formed on one or both sides of the dielectric layer. Examples of suitable materials that may be used to form a dielectric layer include, but are not limited to, various plastics, one or more polymeric materials, one or more polyolefins (e.g., polyethylene, polypropylene, etc.), one or more fluoropolymers (e.g., fluorinated ethylene propylene ("FEP"), polyester, polytetrafluoroethylene, polyimide, or some other polymer, combination of polymers, or dielectric material(s) that does not ordinarily conduct electricity. In certain embodiments, a separate dielectric layer and electrically conductive layer may be bonded, adhered, or otherwise joined (e.g., glued, etc.) together to form the shield 220. In other embodiments, electrically conductive material may be formed on a dielectric layer via any number of suitable techniques, such as the application of metallic ink or paint, liquid metal deposition, vapor deposition, welding, heat fusion, adherence of patches to the dielectric, or etching of patches from a metallic sheet. In certain embodiments, the conductive patches can be over-coated with an electrically insulating film, such as a polyester coating. Additionally, in certain embodiments, an electrically conductive layer may be sandwiched between two dielectric layers. In other embodiments, at least two electrically conductive layers may be combined with any number of suitable dielectric layers to form the shield 220. For example, a four layer construction may include respective electrically conductive layers formed on either side of a first dielectric layer. A second dielectric layer may then be formed on one of the electrically conductive layers to provide insulation between the electrically conductive layer and the twisted pairs 205A-D. Indeed, any number of suitable layers of material may be utilized in a shield 220.

In certain embodiments, a cable (e.g., cable 200) may include a separator 210 or filler disposed within the cable core and configured to orient and or position one or more of the twisted pairs 205A-D. The orientation of the twisted pairs 205A-D relative to one another may provide beneficial signal performance. As desired in various embodiments, the separator 210 may be formed in accordance with a wide variety of suitable dimensions, shapes, or designs. For example, a rod-shaped separator, a flat tape separator, a flat separator, an X-shaped or cross-shaped separator, a T-shaped separator, a Y-shaped separator, a J-shaped separator, an L-shaped separator, a diamond-shaped separator, a separator having any number of spokes extending from a central point, a separator having walls or channels with varying thicknesses, a separator having T-shaped members extending from a central point or center member, a separator including any number of suitable fins, and/or a wide variety of other shapes may be utilized. In certain embodiments, material may be cast or molded into a desired shape to form the separator 210. In other embodiments, a tape may be formed into a desired shape utilizing a wide variety of folding and/or shaping techniques. For example, a relatively flat tape separator may be formed into an X-shape or cross-shape as a result of being passed through one or more dies.

In certain embodiments, a separator 210 may be formed from a single segment or portion. In other words, the separator 210 may be formed as a relatively continuous separator along a longitudinal length of the cable 200. In other embodiments, a separator 210 may be formed from a plurality of discrete segments or portions. For example, discrete segments or portions may be positioned adjacent to one another along a longitudinal length of the separator 210. In certain embodiments, gaps or spaces may be present between various segments or portions of the separator 210. In other embodiments, at least a portion of the segments may be arranged in an overlapping configuration. Additionally, in certain embodiments, electrically conductive material may be incorporated into a separator 210. For example, a separator 210 may include electrically conductive material, such as one or more electrically conductive patches (e.g., metallic patches, etc.) formed on or adhered to a dielectric substrate or base. As another example, a separator 210 may include electrically conductive material embedded into or impregnated into a dielectric material. As a result of incorporating electrically conductive material, the separator 210 may function as a shielding element.

The separator 210 may be formed from a wide variety of suitable materials as desired in various embodiments. For example, the dielectric base of the separator 210 and/or various separator segments can include paper, metals, alloys, various plastics, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or any other suitable material or combination of materials. As desired, the separator 210 may be filled, unfilled, foamed, un-foamed, homogeneous, or inhomogeneous and may or may not include additives (e.g., flame retardant and/or smoke suppressant materials).

A wide variety of suitable techniques and/or processes may be utilized to form the separator 210 or various segments of the separator 210. For example, a base material or dielectric material may be extruded, poltruded, or otherwise formed. In certain embodiments, electrically conductive material may be applied to the base material, inserted into the base material, or embedded in the base material. In other embodiments, dielectric material may be formed around electrically conductive material. As desired, the base layer may have a substantially uniform composition, may be made of a wide range of materials, and/or may be fabricated in a single manufacturing pass. Further, the base layer may be foamed, may be a composite, and may include one or more strength members, fibers, threads, or yarns. Additionally, as desired, the base layer may be hollow and/or include any number of longitudinally extending cavities that may optionally be filled with air or some other gas, gel, fluid, moisture absorbent, water-swellable substance, dry filling compound, powder, one or more optical fibers, one or more metallic conductors (e.g., a drain wire, etc.), shielding, or some other appropriate material or element.

In certain embodiments, the separator 210 may be formed as a tape that includes one or more dielectric layers (e.g., plastic, polyester, polyethylene, polypropylene, fluorinated ethylene propylene, polytetrafluoroethylene, polyimide, or some other polymer or dielectric material that does not ordinarily conduct electricity etc.) and, if desired, an electrically conductive layer (e.g., copper, aluminum, an alloy, etc.). A tape separator may be formed in a similar manner as the tape shield layer described above. Additionally, when a separator is formed from a tape, the tape may be formed such that it longitudinally encloses one or more other components of the cable 200, such as one or more optical fibers, a drain wire, etc.

For a segmented separator formed from a plurality of discrete segments, the various portions or segments of the separator 210 may include a wide variety of different lengths and/or sizes. In certain embodiments, separator portions may have a common length. In other embodiments, portions of the separator 210 may have varying lengths. These varying lengths may follow an established pattern or, alternatively, may be incorporated into the cable at random. Additionally, in certain embodiments, each segment or portion of the separator 210 may be formed from similar materials. In other embodiments, a separator 210 may make use of alternating materials in adjacent portions (whether or not a gap is formed between adjacent portions). For example, a first portion or segment of the separator 210 may be formed from a first set of one or more materials, and a second portion or segment of the separator 210 may be formed from a second set of one or more materials. As one example, a relatively flexible material may be utilized in every other portion of a separator 210. As another example, relatively expensive flame retardant material may be selectively incorporated into desired portions of a separator 210. In this regard, material costs may be reduced while still providing adequate flame retardant qualities.

As set forth above, a wide variety of different components of a cable, such as cable 100 or cable 200, may function as shielding elements. For example, a twisted pair separator 120A-D, 225A-D, a separator 210 positioned between twisted pairs, and/or a shield layer formed around a plurality of twisted pairs may function as a shield element. In certain embodiments, the electrically conductive material incorporated into a shield element may be relatively continuous along a longitudinal length of a cable. For example, a relatively continuous foil shield or braided shield may be utilized. In other embodiments, a shield element may be formed as a discontinuous shield element having a plurality of isolated electrical patches. For continuous shield elements (e.g., non-overlapping shield elements), a plurality of patches of electrically conductive material may be incorporated into the shield element, and gaps or spaces may be present between adjacent patches in a longitudinal direction.

For segmented shield elements formed from a plurality of discrete segments, each segment or section of the shield element may include either a single patch of electrically conductive material or a plurality of electrically conductive patches with gaps or spaces between adjacent patches. A wide variety of different patch patterns may be formed as desired in various embodiments, and a patch pattern may include a period or definite step. In other embodiments, patches may be randomly formed or situated on a carrier layer. As desired, any number of carrier layers and electrically conductive layers may be utilized within a shield element or segment of a shield element.

A wide variety of suitable electrically conductive materials or combination of materials may be utilized to form electrically conductive patches incorporated into a shield element including, but not limited to, metallic material (e.g., silver, copper, nickel, steel, iron, annealed copper, gold, aluminum, etc.), metallic alloys, conductive composite materials, etc. Indeed, suitable electrically conductive materials may include any material having an electrical resistivity of less than approximately $1 \times 10^{-7}$ ohm meters at approximately 20° C. In certain embodiments, an electrically conductive material may have an electrical resistivity of less than approximately $3 \times 10^{-8}$ ohm meters at approximately 20° C.

Additionally, individual patches may be separated from one another so that each patch is electrically isolated from the other patches. That is, the respective physical separations between the patches may impede the flow of electricity between adjacent patches. The physical separation of certain patches may result from the overlapping of shield segments. In certain embodiments, such as embodiments in which a plurality of patches are formed on a single shield element segment, the physical separation of other patches may be formed by gaps or spaces, such as gaps of dielectric material. The respective physical separations between the patches may impede the flow of electricity between adjacent patches.

The components of a shield element or various segments of a shield element may include a wide variety of suitable dimensions, for example, any suitable lengths in the longitudinal direction and/or any suitable thicknesses. A dielectric portion included in a shield element or segment may have any desired thickness. Additionally, each electrically conductive patch may include a coating of metal (or other material) having any desired thickness, such as a thickness of about 0.5 mils (about 13 microns) or greater. For example, electrically conductive patches may have a thickness between approximately 1.0 mil (25.4 microns) and approximately 3.0 mils 76.2 microns. In some applications, signal performance may benefit from a thickness that is greater than about 2 mils, for example in a range of about 2.0 to about 2.5 mils, about 2.0 to about 2.25 mils, about 2.25 to about 2.5 mils, about 2.5 to about 3.0 mils, or about 2.0 to about 3.0 mils. A greater thickness may limit negative insertion loss characteristics.

In certain embodiments, an electrically conductive patch may cover substantially an entire area of a separator second portion or another shield element segment (e.g., substantially the entire surface on one side of a carrier layer, etc.). In other embodiments, a plurality of electrically conductive patches may be formed on a given separator second portion, shield element segment, or shield element. A wide variety of segment and/or patch lengths (e.g., lengths along a longitudinal direction of a cable) may be utilized. As desired, the dimensions of the segments and/or electrically conductive patches can be selected to provide electromagnetic shielding over a specific band of electromagnetic frequencies or above or below a designated frequency threshold. In various embodiments, the segments and/or patches can have a length of about 0.5, 0.75, 1.0, 1.5, 2.0, 2.5, 3.0, 3.5, 4.0, 4.5, or 5.0 meters or in a range between any two of these values. In other embodiments, lengths may be less than 0.5 meters or greater than 5.0 meters.

In the event that a plurality of patches is formed on a shield element (e.g., a second portion of a twisted pair separator, etc.) or a shield element segment, a wide variety of suitable gap distances or isolation gaps may be provided between adjacent patches. For example, the isolation spaces can have a length of about 0.5, 1.0, 1.5, 2.0, 2.5, 3.0, 3.5, or 4 millimeters or in a range between any two of these values. In one example embodiment, each patch may be at least two meters in length, and a relatively small isolation gap (e.g., 4 millimeters or less, about $\frac{1}{16}$ of an inch, etc.) may be formed between adjacent patches. Additionally, the patches may be formed as first patches (e.g., first patches on a first side of a dielectric material), and second patches may be formed on an opposite side of the dielectric material (or on another dielectric material). For example, second patches may be formed to correspond with the gaps or isolation spaces between the first patches. As desired, the electrically conductive patches may have a wide variety of different shapes and/or orientations. For example, the segments and/or patches may have a rectangular, trapezoidal, or parallelogram shape. A few example shapes for patches are described in greater detail below with reference to FIGS. 7A-7D.

In certain embodiments, electrically conductive patches may be formed to be approximately perpendicular (e.g., square or rectangular segments and/or patches) to the longitudinal axis of the adjacent one or more twisted pairs (e.g., pairs enclosed by a shield, pairs adjacent to a separator, etc.). In other embodiments, the patches may have a spiral direction that is opposite the twist direction of the enclosed one or more pairs. That is, if the twisted pair(s) are twisted in a clockwise direction, then the segments and/or patches may spiral in a counterclockwise direction. If the twisted pair(s) are twisted in a counterclockwise direction, then the conductive patches may spiral in a clockwise direction. Thus, twisted pair lay opposes the direction of the segment and/or patch spiral. The opposite directions may provide an enhanced level of shielding performance. In other embodiments, the segments and/or patches may have a spiral direction that is the same as the twist direction of the enclosed one or more pairs.

According to an aspect of the disclosure, one or more techniques may be utilized to reduce and/or eliminate electrical perturbations between conductive patches and/or at the circumferential edges of a shield element. As desired, these techniques may be applied to twisted pair separators, shield layers, and/or to separators formed between twisted pairs. As one example technique, in certain embodiments, one or more electrically conductive patches included in a shield element may be electrically shorted or electrically continuous along a circumferential direction of the shield element. As another example technique, a shield element may be formed with overlapping segments in order to effectively eliminate longitudinal spaces or gaps between adjacent patches formed on the shield element. Each of these techniques are described in greater detail below.

In certain embodiments, one or more electrically conductive patches included in a shield element may be electrically shorted or continuous along a circumferential direction. For example, when the one or more second portions of a twisted pair separator, such as separator 120, are wrapped around the conductors of a twisted pair, the patch(es) formed on the second portion(s) may contact one another such that a relatively continuous patch is formed around the twisted pair conductors. In embodiments with a single second portion, a patch may be brought into contact with itself when the second portion is wrapped around the conductors. In embodiments with a plurality of second portions, the electrically conductive material on each second portion may be brought into contact with the electrically conductive material on another second portion (e.g., an adjacent second portion, etc.) such that a relatively continuous shield layer is formed in a circumferential direction.

As another example, when a shield layer, such as shield layer 220, is wrapped or formed around one or more twisted pairs, a patch may contact itself at or near the edges of the shield 220. As another example, when a separator (e.g., separator 210, etc.) is formed from a tape, a patch may contact itself at or near the edges of the tape. As yet another example, a patch may be formed on a separator 210 such that the patch extends around the circumference of the separator 210 and contacts itself. In any of the examples mentioned above, a patch (or group of patches formed around a circumference of a shield element) may be electrically shorted, thereby creating a continuous patch in a circumferential direction or along a periphery of the shield element. When one or more patches are electrically shorted in a circumferential direction, electrical perturbations caused by the shield element may be reduced relative to conventional cables. Therefore, a cable may exhibit improved electrical performance, such as reduced return loss and/or reduced cross-talk loss.

A wide variety of suitable methods or techniques may be utilized to electrically short patches in a circumferential direction. A few example methods or techniques that may be utilized in conjunction with twisted pair separators are illustrated and described in greater detail below with reference to FIGS. 9A-9D. Similar methods or techniques may be utilized in conjunction with shield layers and/or separators formed between one or more twisted pairs.

In certain embodiments, at least one shield element, such as a twisted pair separator, shield layer, or separator formed between two or more twisted pairs, may be formed to include overlapping segments. As desired, a shield element may be formed to include a plurality of electrically conductive patches arranged in a discontinuous manner. In other words, the electrically conductive patches may be electrically isolated from one another. However, in contrast to conventional shield elements, the shield element may not include spaces or gaps between certain patches along a longitudinal direction of the cable. The shield element may include a plurality of discrete overlapping segments or sections along a longitudinal length of the cable, and each segment may include at least one electrically conductive patch or portion. The combination of the segments may form a discontinuous shield element; however, the overlapping nature of the segments may eliminate gaps between certain patches along a longitudinal direction. Thus, the discontinuous shield element may exhibit improved electrical performance relative to conventional discontinuous shields.

When forming a shield element, each shield element segment may include a carrier layer (e.g., a dielectric layer, etc.) with one or more electrically conductive patches formed thereon. Adjacent segments may be positioned so that an end of a first segment (e.g., a second or distal end along the longitudinal direction or length of a cable) is overlapped by the first end of a second segment. In other words, the segments may be incorporated into a cable to include overlapping edges along a length of the cable.

Further, the carrier layers of the shield segments may provide isolation between the electrically conductive patches formed on each segment. For example, at an overlapping region, a first segment may include an electrically conductive patch formed on a dielectric material. A second segment may have a similar construction. When incorporated into the cable, the dielectric material of the second segment may be positioned over, positioned around, and/or in contact with the electrically conductive patch of the first segment at the overlapping region. Thus, electrical isolation exists between the electrically conductive patch of the first segment and the electrically conductive patch of the second segment.

A wide variety of suitable methods or techniques may be utilized as desired to form a shield element with overlapping segments. For example, in certain embodiments, electrically conductive material (e.g., one or more patches of electrically conductive material) may be formed on a carrier or substrate layer (e.g., a dielectric layer, a tape, etc.), and the carrier layer may be cut or otherwise divided in order to form segments that will be utilized in the shield element. In other embodiments, respective electrically conductive material may be formed on a plurality of carrier or substrate layers (e.g., precut sections of a dielectric material, etc.) that will be incorporated into the shield element. Once suitable segments have been formed, the segments may be assembled in a desired overlapping configuration to form the shield element. Additionally, any number of suitable techniques may be utilized as desired to hold the segments of a shield element in place. For example, an adhesive (e.g., a contact adhesive, a pressure sensitive adhesive, a hot melt adhesive) may be applied to a segment in order to adhere the segment to one or more other segments and/or other components of a cable.

A wide variety of segment overlap distances may be utilized in various embodiments of the disclosure. For example, a first segment may overlap a second segment along a longitudinal direction of a cable by approximately 0.25 inches (0.00635 meters), 0.5 inches (0.0127 meters), 1 inch (0.0254 meters), 1.5 inches (0.0381 meters), 2 inches (0.0508 meters), more than approximately 0.25 inches, more than approximately 0.5 inches, more than approximately 1 inch, more than approximately 2 inches, a distance included in any suitable range formed using any of the values above, or any other desirable distance. Additionally, in certain embodiments, the overlap distances formed between various pairs of segments may be approximately equal. In other embodiments, various pairs of segments may have different overlap distances.

As desired in various embodiments, a wide variety of other materials may be incorporated into a cable, such as the cables 100, 200 illustrated in FIGS. 1 and 2. For example, as set forth above, a cable may include any number of conductors, twisted pairs, optical fibers, and/or other transmission media. In certain embodiments, one or more tubes or other structures may be situated around various transmission media and/or groups of transmission media. Additionally, as desired, a cable may include a wide variety of strength members, swellable materials (e.g., aramid yarns, blown swellable fibers, etc.), insulating materials, dielectric materials, flame retardants, flame suppressants or extinguishants, gels, and/or other materials. The cables 100, 200 illustrated in FIGS. 1 and 2 provided by way of example only. Embodiments of the disclosure contemplate a wide variety of other cables and cable constructions. These other cables may include more or less components than the cables 100, 200 illustrated in FIGS. 1 and 2. Additionally, certain components may have different dimensions and/or materials than the components illustrated in FIGS. 1 and 2.

Example Twisted Pair Separator Constructions

As set forth above, a twisted pair separator, such as separator 120, may be formed with a wide variety of suitable constructions, cross-sectional shapes, and/or dimensions. FIGS. 3A-5F illustrate a few example constructions of twisted pair separators that may be utilized in conjunction with a wide variety of cables, such as the cables 100, 200 illustrated in FIGS. 1 and 2. In other words, any of the separators illustrated in FIGS. 3A-5F may be substituted into the cables 100, 200 discussed above and/or incorporated into any other suitable cable designs.

Figure 3A:
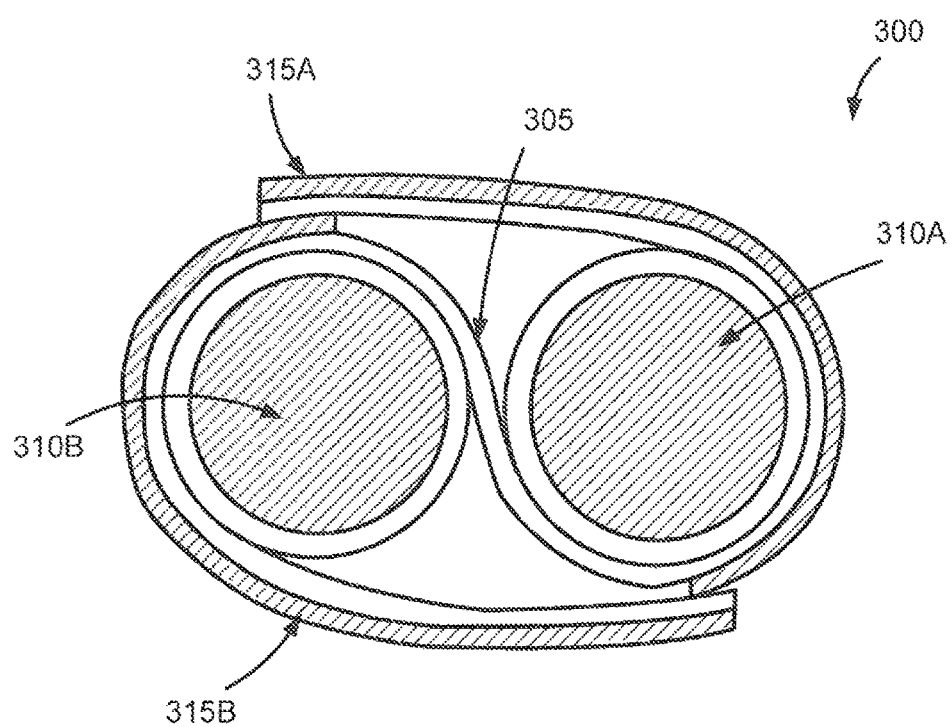
FIGS. 3A-3C are cross-sectional views of example cable components that function as both twisted pair separators and shields, according to illustrative embodiments of the disclosure.

Turning first to FIG. 3A, a cross-sectional view of a first example twisted pair separator 300 is illustrated. The separator 300 may include a first portion 305 that is positioned between the conductors 310A, 310B of a twisted pair. Additionally, the separator 300 may include two second portions 315A, 315B that extend from the first portion 305. For example, a first second portion 315A may extend from a first end of the first portion 305, and another second portion 315B may extend from an opposite end of the first portion 305.

The first portion 305 may be formed from a suitable dielectric material. Each of the second portions 315A, 315B may include electrically conductive material formed on a dielectric substrate or base layer. Additionally, each of the second portions 315A, 315B may be wrapped around an outer periphery of the twisted pair. For example, each of the second portions 315A, 315B may be wrapped in a common direction around an outer periphery or circumference of the twisted pair until the two second portions 315A, 315B contact one another. As a result, the second portions 315A, 315B may collectively form a shield layer around the conductors of the twisted pair. As shown, each second portion may have similar or approximately equal lengths. As a result each second portion may be wrapped an approximately equal distance around the outer periphery of the twisted pair. In other embodiments, the two second portions may have different lengths and/or constructions.

In certain embodiments, the separator 300 may be formed from a suitable tape or flexible material. For example, a dielectric tape may be utilized to form both the first portion 305 and the respective base layers of the second portions 315A, 315B. In other words, the same dielectric material may extend through the first portion 305 and each of the second portions 315A, 315B. As explained in greater detail below, other separators may utilize different materials to form the first portion and one or more second portions. With continued reference to FIG. 3A, electrically conductive material may be selectively formed on the dielectric tape within the second portions. As a result, electrically conductive material will not be positioned between the conductors 310A, 310B along the first portion 305.

The various components or portions of the separator 300 may additionally include a wide variety of suitable dimensions, such as any suitable widths and/or thicknesses. For example, a first portion may have a width (i.e., a width in a direction perpendicular to the longitudinal direction of the separator 300 that extends along a cable) that is approximately equal to a distance from a first point (i.e., a point positioned at the top, etc.) along a perimeter of a first conductor extending between the two conductors of a twisted pair to a second point (i.e., a point positioned at the bottom, etc.) along a perimeter of the second conductor. In one example embodiment, if the first point is at a given position along the perimeter of the first conductor, the second point may be approximately 180 degrees shifted from a corresponding or equivalent first point along the perimeter of the second conductor. With continued reference to FIG. 3A, each second portion may extend from a respective end of the first portion, and each second portion may have a width that is sufficient to extend the second portion around a conductor of the twisted pair until it is brought into contact with the other second portion. As desired, the width of a second portion may be longer, for example, to allow electrically conductive material to be circumferentially shorted or to allow a double-wrapped shield to be formed.

A dielectric material or base material that forms the first portion 305 and extends through the second portions 315A, 315B may have any suitable thickness. For example, the dielectric material may have a thickness of approximately 0.5 mils (12.7 microns) to approximately two mils (50.8 microns). As another example, the dielectric material may have a thickness of approximately 0.5 mils, 0.75 mils, 1.0 mils, 1.5 mils, 2.0 mils, 2.5 mils, 3.0 mils, 3.5 mils, 4.0 mils, 4.5 mils, 5.0 mils, or a thickness included in a range between any two of these values. As yet another example, the dielectric material may have a thickness that is greater than approximately 5.0 mils. Additionally, electrically conductive material formed on the second portions may have any suitable thickness, such as a thickness between approximately 1.0 mils (25.4 microns) and approximately 3.0 mils. In other embodiments, the electrically conductive material may have a thickness of approximately 0.5 mils, 0.75 mils, 1.0 mils, 1.5 mils, 2.0 mils, 2.5 mils, 3.0 mils, 3.5 mils, 4.0 mils, 4.5 mils, 5.0 mils, or a thickness included in a range between any two of these values. In yet other embodiments, the dielectric material may have a thickness that is greater than approximately 5.0 mils.

A wide variety of suitable methods or techniques may be utilized to incorporate the separator 300 into a cable. For example, during cable construction, a tape utilized to form the separator 300 may be fed from one or more suitable spools or other sources. Similarly, the two conductors 310A, 310B utilized to form a twisted pair may be fed from suitable sources. The first portion 305 of the separator 300 may be positioned between the conductors 310A, 310B of the twisted pair. Each of the second portions 315A, 315B may then be respectively wrapped around the conductors 310A, 310B until the second portions 315A, 315B contact one another. As desired, one or more suitable adhesives or mechanical coupling devices may be utilized to bond a second portion to another second portion (and/or to other layers such as a first portion, etc.) when wrapped the second portion is wrapped around an outer periphery of the twisted pair. Additionally, following incorporation of the separator 300, the separator 300 and the twisted pair conductors may be helically twisted together.

It will be appreciated that other types of separators, such as the separators discussed below with reference to FIGS. 3B-5F may be incorporated into a twisted pair and/or a cable in a similar manner as that discussed above for the separator 300 of FIG. 3A. For example, a first portion of a separator may be positioned between the conductors of a twisted pair. One or more second portions of the separator may then be wrapped around an outer periphery of a twisted pair in order to form a suitable shield layer.

Figure 3B:
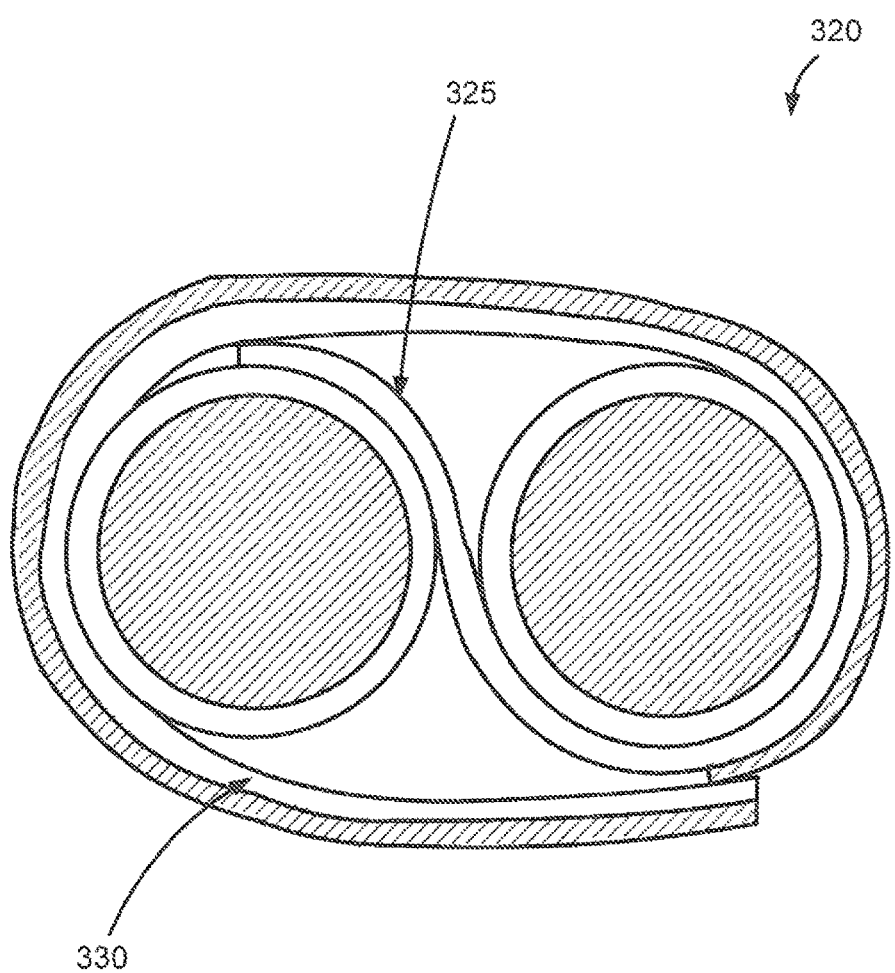

FIG. 3B illustrates a cross-sectional view of another example twisted pair separator 320. The separator 320 may be similar to the separator 300 illustrated in FIG. 3A; however, the separator 320 of FIG. 3B is formed with a single second portion. A first portion 325 may be positioned between the conductors of a twisted pair, and a second portion 330 may extend from one end or edge of the first portion 325. The second portion 330 may have a width that is sufficient for the second portion 330 to be wrapped around the two conductors of the twisted pair until the second portion is brought into contact with itself. In this regard, the single second portion 330 may be utilized to form a shield around the twisted pair.

Figure 3C:
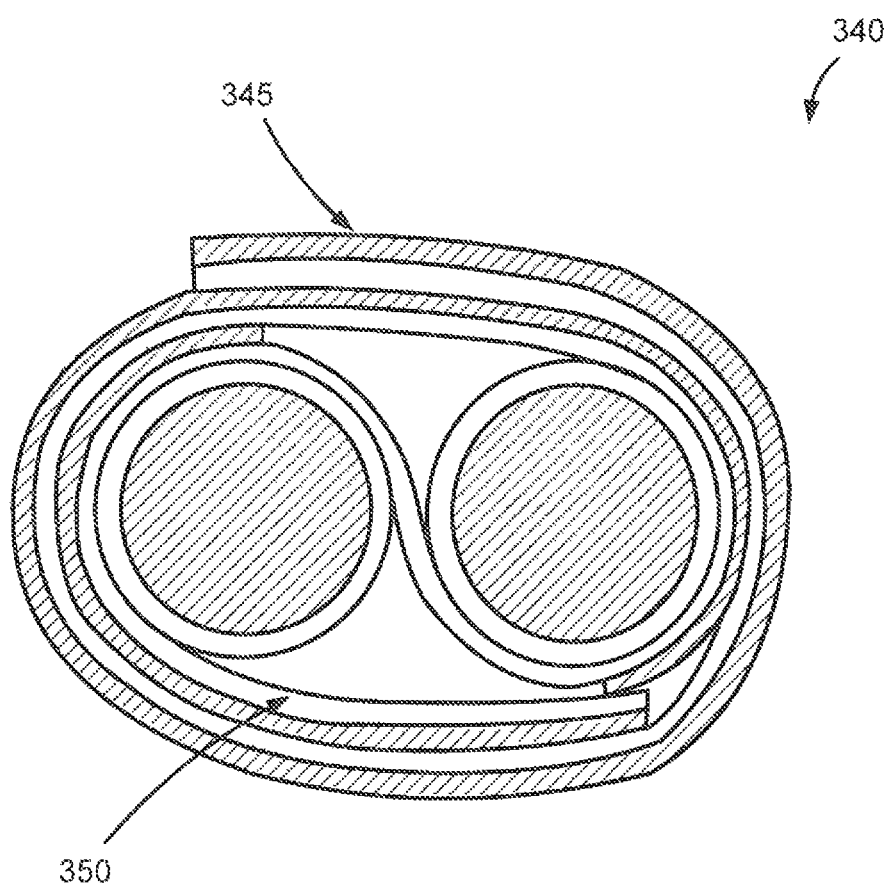

FIG. 3C depicts a cross-sectional view of another example twisted pair separator 340. The separator 340 may be similar to the separator 300 illustrated in FIG. 3A; however, the separator 340 of FIG. 3C may include at least one second portion 345 that forms a relatively larger overlap region when wrapped around an outer circumference of the twisted pair. The separator 340 is illustrated with two second portions 345, 350. When wrapped around the outer circumference of the twisted pair, a relatively small overlap is formed by one second portion 350 when it is brought into contact with the other second portion 345. However, a relatively large overlap may be formed by the other second portion 345. Indeed, as illustrated in FIG. 3C, the second portion 345 may be wrapped around the outer circumference of the twisted pair until a double shield wrap is formed. For example, one second portion 350 may form a shield layer that covers approximately half of the outer circumference of the twisted pair. The other second portion 345 may then form a shield layer that covers approximately the other half of the outer circumference and that is further wrapped again around the outer circumference of the twisted pair (and the underlying shield layer). As a result, a double shield layer may be formed. Although the second portion 345 is illustrated as being wrapped approximately 1.5 times around the outer circumference of the twisted pair, in other embodiments, a second portion may be wrapped 1.75 times, 2.0 times, 2.5 times, 3.0 times, or any other desired number of times around the outer circumference of the twisted pair.

Additionally, although the separator 340 of FIG. 3C is illustrated as having two second portions 345, 350, other suitable separators may be formed with any number of second portions. For example, a separator may include a single second portion that forms a substantial overlap region (e.g., double wrapped, etc.) with itself when wrapped around a twisted pair. As another example, a separator may include three second portions, and one of the three second portions may be formed with a relatively large overlap.

Figure 4A:
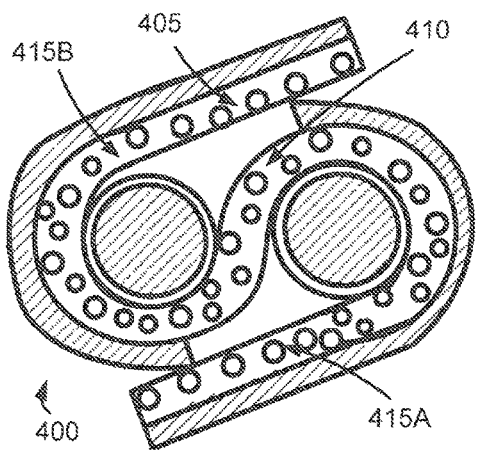
FIGS. 4A-4E are cross-sectional views of other example cable components that function as both twisted pair separators and shields, according to illustrative embodiments of the disclosure.

The separators 300, 320, 340 of FIGS. 3A-3C are illustrated as having a base layer formed from a relatively thin dielectric layer, such as a dielectric tape. In other embodiments, separators may be formed with other types of dielectric layers and/or with a combination of dielectric layers. FIG. 4A illustrates an example twisted pair separator 400 in which a base layer 405 extending through both a first portion 410 and one or more second portions 415A, 415B is formed from and/or includes a foamable or foamed material. In certain embodiments, use of a foamed material may result in a greater separation distance between the electrically conductive material of the second portions 415A, 415B and the twisted pair conductors. This greater separation may lead to improved electrical performance. Additionally, foamed materials include air bubbles or air pockets and, as a result, foamed materials may have improved dielectric properties relative to non-foamed materials.

A wide variety of suitable foamed or foamable materials may be utilized in various embodiments. These materials may utilize a wide variety of suitable foaming or blowing agents. Additionally, in certain embodiments, a heat-activated foaming agent may be incorporated into a foamable material. Following the formation of a separator 400 and/or following incorporation of the separator 400 into a twisted pair, an induction heater or other suitable heating device may be utilized to heat the electrically conductive material formed on the one or more second portions 415A, 415B. This heating may activate the foaming agent within the one or more second portions 415A, 415B. As a result, foaming may be selectively controlled to the second portion(s) 415A. 415B situated on the outer periphery of the twisted pair while the first portion 410 is not foamed. Thus, a greater separation distance may be formed between the electrically conductive material and the twisted pair conductors while a smaller separation distance is formed between the individual conductors of the twisted pair. A wide variety of suitable foaming levels may be utilized as desired. Additionally, when foamed, a layer may have any suitable thickness, such as a thickness between approximately 50 µm and approximately 500 µm. In various embodiments, a foamed layer may have a thickness of approximately 1.0 mils (25.4 µm), 2.0 mils (50.8 µm), 3.0 mils (76.2 µm), 4.0 mils (101.6 µm), 5.0 mils (127 µm), 10.0 mils (254 µm), 15.0 mils (381 µm), 20.0 mils (508 µm), any thickness included in a range between two or more of the above values, or any thickness greater than one of the above values.

Figure 4B:
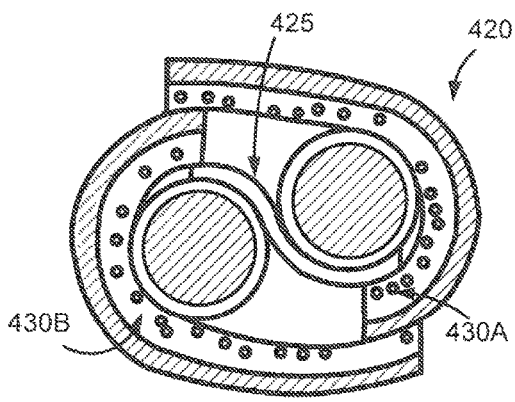

FIG. 4B illustrates an example twisted pair separator 420 in which a first portion 425 is formed from a first material, such as a dielectric tape. Respective base layers 430A, 430B for one or more second portions may then be attached to and extend from the first portion 425. As illustrated, the base layers 430A, 430B may be formed from one or more foamable materials; however, other suitable types of dielectric materials may be utilized as desired. The base layers 430A, 430B may be formed with any suitable thickness, such as thicknesses similar to those discussed above with reference to FIG. 4A. As a result of forming the base layers of 430A, 430B of the second portion(s) from different material(s) than that utilized for the first portion 425, a wide variety of desirable characteristics may be obtained by the separator 420. For example, a greater separation distance may be maintained between the electrically conductive material formed on the second portion(s) and the encapsulated twisted pair conductors. As another example, flame retardant material, smoke suppressants, and/or other types of desired materials may be selectively incorporated into a separator 420.

Figure 4C:
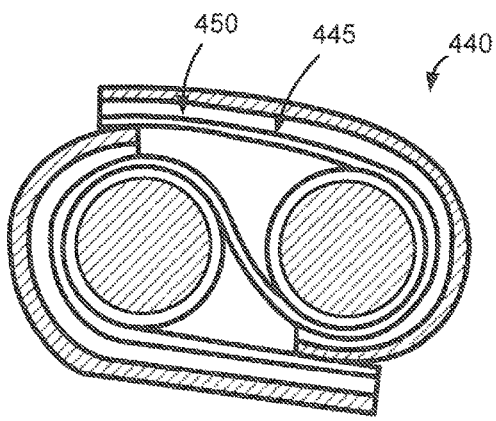
Figure 4D:
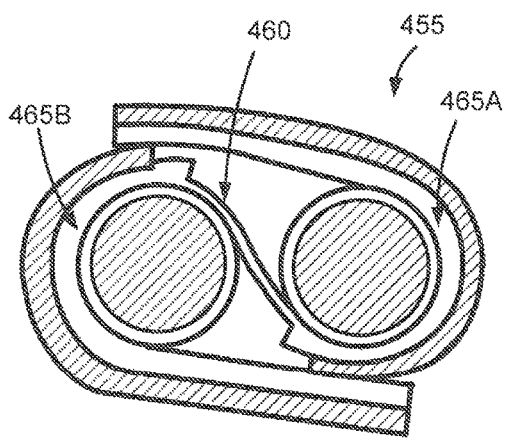

FIG. 4C illustrates an example twisted pair separator 440 in which a dielectric material 445 extends through both a first portion and one or more second portions. Another material 450 may then be formed or attached to the dielectric material 445 within the second portions. For example, a foamed material, flame retardant material, or other suitable material may be utilized within the second portions. As a result, the separator 440 may have a greater thickness within the one or more second portions, such as thickness similar to that discussed above with reference to FIG. 4A. FIG. 4D illustrates another example separator 455 in which a single material is utilized for both a first portion 460 and one or more second portions 465A, 465B. However, the material may have a greater thickness within the one or more second portions 465A, 465B than the material has in the first portion 460. In this regard, a desired separation distance may be maintained between the electrically conductive material and the enclosed twisted pair conductors. In certain embodiments, the separator 455 may include a dielectric material that is molded or otherwise formed to have a varying thickness, such as a suitable polymeric or plastic material. A wide variety of suitable thicknesses may be utilized within the second portion(s), such as thicknesses similar to those discussed above with reference to FIG. 4A.

Figure 4E:
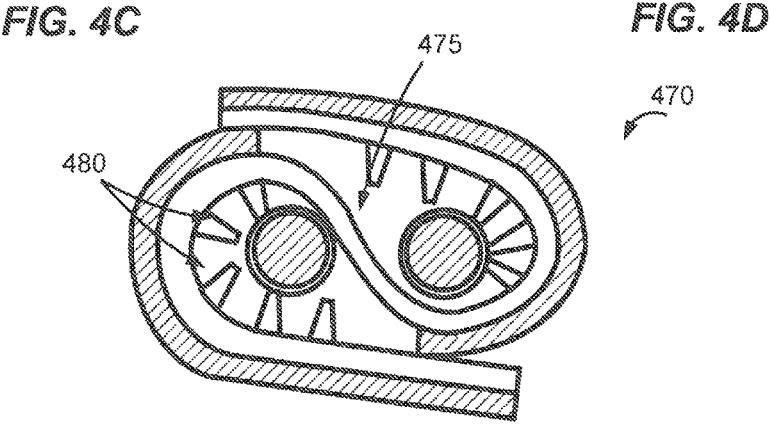

FIG. 4E illustrates yet another example twisted pair separator 470 that provides for a greater separation distance between the twisted pair conductors and electrically conductive shielding material than the distance provided between the two twisted pair conductors. The separator 740 may include a dielectric material 475 that extends through a first portion and one or more second portions. Additionally, one or more 480 extensions, projections, or other features may project from the underside of the dielectric material 475 within the one or more second portions in order to provide a suitable separation distance. Any number of projections 480 may be utilized as desired, and the projections 480 may have any suitable dimensions. For example, a projection 480 may have any suitable length that facilitates a desired separation distance, such as a length between approximately one fourth of the diameter of a twisted pair conductor and approximately two times the diameter of a conductor. A projection 480 may also have any suitable thickness and/or cross-sectional shape. For example, rounded projections or studs may be utilized. In certain embodiments, projections 480 may be attached (e.g., adhered, fastened, etc.) to the dielectric material 475. In other embodiments, the separator 470 may be molded or otherwise processed from a unitary piece of material in order to form the projections 480.

FIGS. 3A-4E generally illustrate twisted pair separators that are formed from relatively flat materials, such as dielectric tapes, etc. In other embodiments, at least a portion of a separator, such as the first portion positioned between the twisted pair conductors, may be formed from other suitable materials (e.g., molded materials, etc.) and/or from materials that do not have a relatively flat construction. For example, separators may include first portions that assist in maintaining the positions of the twisted pair conductors and/or that may prevent or limit movement of the conductors.

Figure 5A:
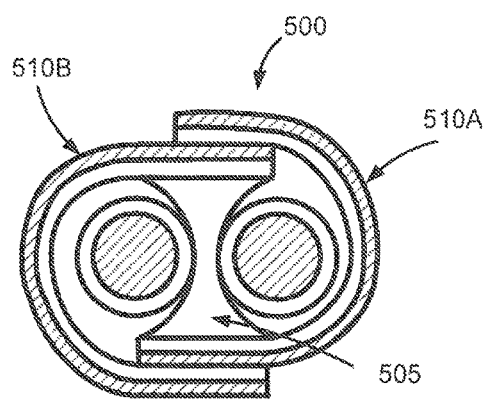
FIGS. 5A-5F are cross-sectional views of other example cable components that function as both twisted pair separators and shields, according to illustrative embodiments of the disclosure.

FIG. 5A illustrates a cross-sectional view of an example separator 500 having a first portion 505 that includes respective concave surfaces that contact the conductors of a twisted pair. As a result, the first portion 505 may provide for a desired separation distance between the conductors while further assisting in maintaining the conductor positions. In other words, a thinner section of the first portion 505 may be positioned between the conductors while the thicker end sections of the first portion 505 assist in maintaining the positions of the conductors. The first portion SOS may be formed from a wide variety of suitable materials, such as plastic materials, polymeric materials, and/or other suitable dielectric materials. In certain embodiments, the first portion 505 may be formed from one or more molded or extruded materials. Additionally, the first portion filled, unfilled, foamed, un-foamed, homogeneous, or inhomogeneous and may or may not include one or more additives (e.g., flame retardant and/or smoke suppressant materials). With continued reference to FIG. 5A, two second portions 510A, 510B may be attached or affixed to the first portion 505. The second portions 510A, 510B may include electrically conductive material formed on a suitable dielectric substrate (e.g., a dielectric tape, etc.), and the second portions 510A, 510B may be wrapped around an outer periphery of the twisted pair conductors in order to form a suitable shield layer.

Figure 5B:
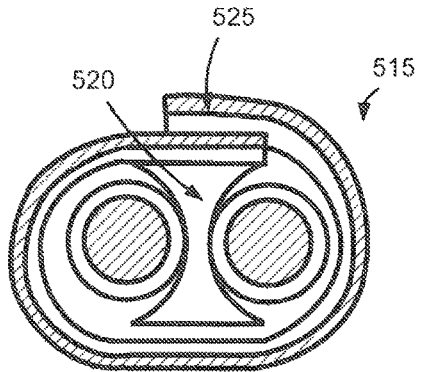

FIG. 5B illustrates another example separator 515 that may be utilized in various embodiments. The separator 515 of FIG. 5B may be similar to the separator 500 illustrated in FIG. 5A and may include a similar first portion 520; however, the separator 515 of FIG. 5B may include a single 525 second portion attached to the first portion 520. Indeed, any number of second portions may be utilized in a separator design.

Figure 5C:
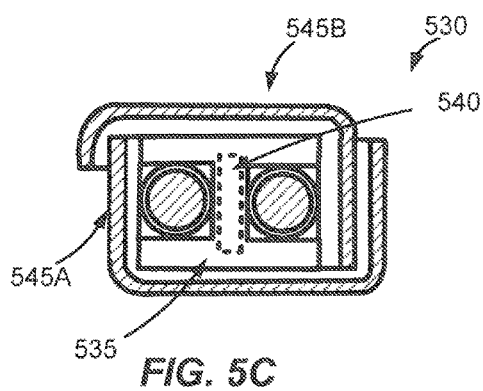

FIG. 5C illustrated an example separator 530 in which a first portion 535 is formed with an H-shaped cross-section. The first portion 535 may include a central section positioned between the twisted pair conductors, and side sections which extend adjacent to the conductors from the central section at approximately right angles. As a result, the first portion 535 may form respective cavities in which the conductors may be positioned or situated. The first portion may be formed from a wide variety of suitable materials as desired. For example, in certain embodiments, the first portion 535 may be formed from one or more extruded or molded materials. In other embodiments, the first portion 535 may be formed from a tape that is folded or otherwise formed into a desired cross-sectional shape.

In certain embodiments, one or more longitudinally extending cavities 540 may optionally be formed within the first portion 535. As desired, one or more transmission media (e.g., optical fibers, optical fiber ribbons, etc.), one or more shielding components, water swellable material, and/or a wide variety of other suitable components may be positioned within or incorporated into the first portion 535. In other embodiments, the first portion 535 may be impregnated with and/or formed around other suitable cable components. Additionally, as desired, any number of suitable additives (e.g., flame retardant additives, smoke suppressants, water swellable powder, etc.) may be incorporated into the first portion 535. With continued reference to FIG. 5C, one or more second portions 545A, 545B may be attached or affixed to the first portion 540, and the one or more second portions 545A, 545B may be wrapped around an outer periphery of the twisted pair in order to form a suitable shield.

Figure 5D:
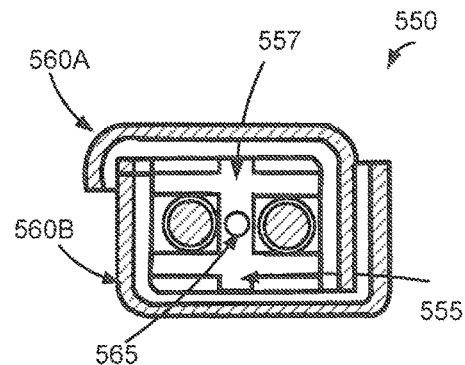

FIG. 5D illustrate another example separator 550 having a first portion 555 that includes respective cavities into which twisted pair conductors may be situated. The first portion 555 of the separator 550 may have a similar cross-sectional shape as the separator 530 illustrated in FIG. 5C; however, the first portion 555 may include one or more projections 557 or extensions that assist in maintaining a desired separation distance between the electrically conductive material of one or more second portions 560A, 560B and the twisted pair conductors. As desired, the sections of the first portion 555 that form cavities into which the conductors are situated may extend beyond the conductors to assist in maintaining a desired separation distance between the second portions 560A, 560B and the conductors. With continued reference to FIG. 5D, the first portion 555 may additionally include one or more longitudinally extending cavities 560 formed therein, such as a cavity into which an optical fiber may be positioned.

Figure 5E:
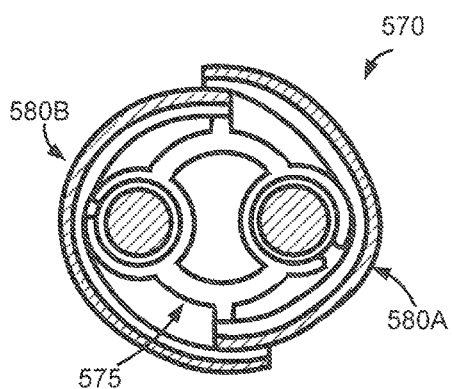

FIG. 5E illustrates another example separator 570 that includes a first portion 575 that assists in maintaining the positions of the twisted pair conductors. The first portion 575 may include one or more clip-like portions that form respective channels into which the conductors may be situated. Additionally, a gap (e.g., an air gap) may be formed between the two channels. With continued reference to FIG. 5E, one or more second portions 580A, 580B may be attached or affixed to the first portion 575, and the second portions 580A, 580B may be utilized to form a shield around the conductors.

Figure 5F:
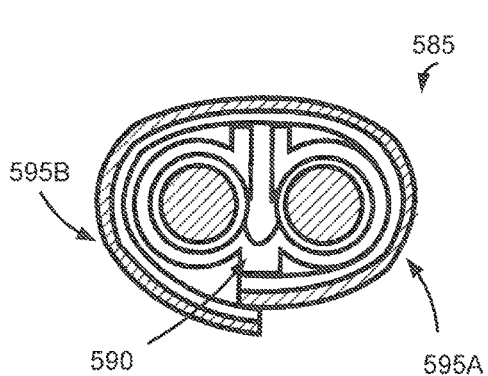

FIG. 5F illustrates another example separator 585 that includes a first portion 590 that assists in maintaining the positions of the twisted pair conductors. Similar to the separator 570 illustrated in FIG. 5E, the first portion 590 may include one or more clip-like portions that form respective channels into which the conductors may be situated. Additionally, a gap (e.g., an air gap) may be formed between the two channels. It is important to note that the first portion 590 does not extend all the way between the two conductors. Indeed, a first portion 590 of a separator may only extend partially between the two conductors of a twisted pair, and such a separator may still be considered to have a first portion positioned between the two conductors of the twisted pair. With continued reference to FIG. 5F, one or more second portions 595A, 595B may be attached or affixed to the first portion 590, and the second portions 595A, 595B may be utilized to form a shield around the conductors.

A wide variety of other suitable twisted pair separators may be utilized as desired in various embodiments. These separators may include any suitable cross-sectional shapes, layers, constructions, and/or materials. The separators illustrated in FIGS. 3A-5F are provided by way of non-limiting example only. Further, separators may be formed that incorporate various aspects of any of the separators described herein.

Figure 6A:
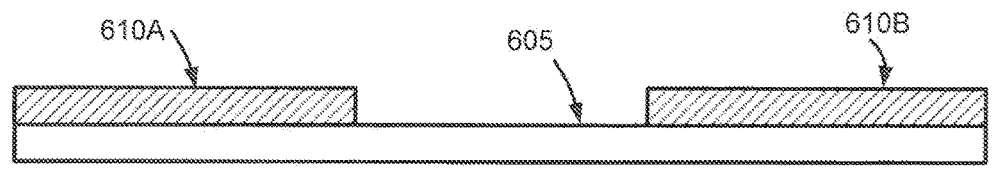
FIGS. 6A-6H are cross-sectional views of example tape or flexible structures that may be utilized to form twisted pair separators, according to illustrative embodiments of the disclosure.
Figure 6B:
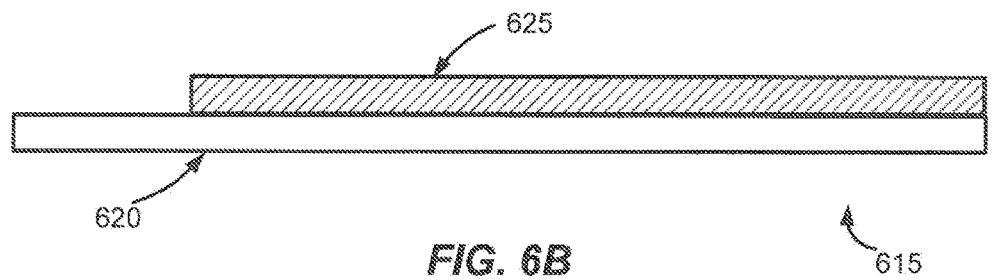

As set forth above, a twisted pair separator may be formed with any number of suitable layers of material and/or layer configurations. FIGS. 6A-6H illustrate cross-sectional views of example tapes or flexible structures that may be utilized to form twisted pair separators, according to illustrative embodiments of the disclosure. FIG. 6A illustrates an example tape structure 600 that includes a dielectric layer 605 or substrate layer that forms a first portion and extend from either end of the first portion to serve as a base layer for two second portions. Respective electrically conductive material 610A, 610B may then be formed on the dielectric layer 605 in the second portions. As set forth above, the tape 600 and/or various components of the tape may have a wide variety of suitable dimensions, such as thicknesses and/or widths of various portions (e.g., the first portion, one or more second portions). FIG. 6B illustrates another example tape structure 615 that includes a dielectric layer 620 that forms a first portion and that extends from one end of the first portion to serve as a base layer for a single second portion. Electrically conductive material 625 may then be formed on the base layer within the second portion. The tape structure 615 of FIG. 6B may be utilized to form a twisted pair separator having a single second portion that extends around an outer periphery of a twisted pair until it contacts itself.

Figure 6C:
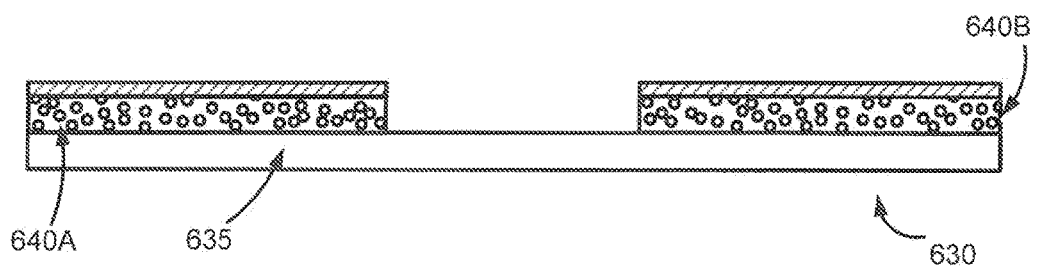

FIG. 6C illustrates an example tape or flexible structure 630 that includes a dielectric layer 635 that forms a first portion and that extends laterally from either end of the first portion to form a base layer for two respective second portions. Additionally, the structure 630 includes respective foamed layers 640A, 640B formed on the dielectric layer 635 within the second portions, and electrically conductive material is illustrated as being formed on the foamed layers 640A, 640B. In other embodiments, electrically conductive material may be formed within the second portions directly on the dielectric layer 635, and foamed layers 640A, 640B or other suitable layers may be formed on an opposite side of the dielectric layer 635 from the electrically conductive material.

Figure 6D:
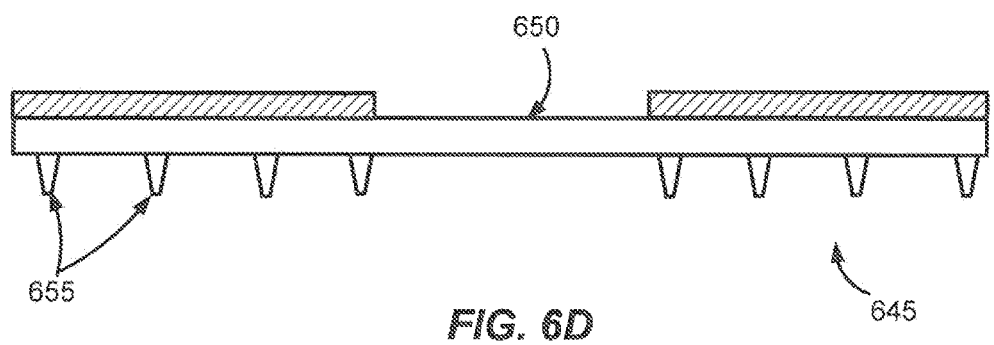

FIG. 6D illustrates an example tape or flexible structure 645 that includes a dielectric layer 650 that forms a first portion and that extends laterally from the first portion to form a base layer for one or more second portions that include electrically conductive material. Additionally, as illustrates, any number of spacing elements, prongs, and/or other projections 655 may extend from an underside of the dielectric layer within the one or more second portions. These projections or spacing elements may assist in maintaining a desired separation distance between the electrically conductive material and the twisted pair conductors enclosed by a separator formed from the flexible structure 645.

Figure 6E:
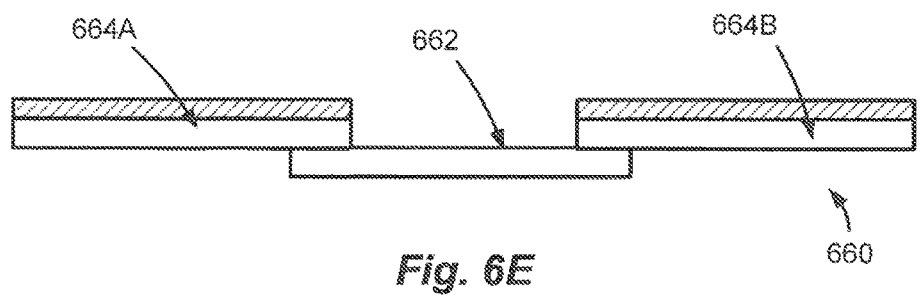

FIG. 6E illustrates an example tape or flexible structure 660 in which a first portion 662 is formed from a first material or layer. One or more layers 664A, 664B may then be attached to the first portion 662 and extend from the first portion 662 to form one or more second portions. As desired, the additional layer(s) 664A, 664B may be formed from different materials than the first portion 662 and/or from materials having a different thickness than the first portion 662. For example, the additional layer(s) 664A, 664B may be formed from foamed materials, flame retardant materials, etc. Electrically conductive material may then be formed on the additional layer(s) 664A, 664B.

Figure 6F:
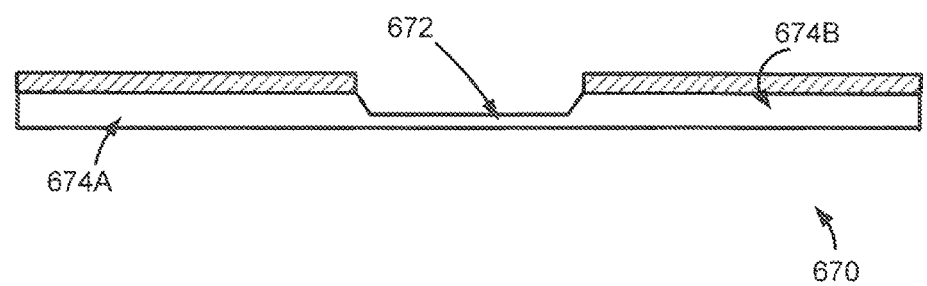

FIG. 6F illustrates an example tape or flexible structure 670 that includes a dielectric layer that extends through both a first portion 672 and one or more second portions 674A, 674B. However, the dielectric layer is formed to have a first thickness within the first portion 672 and a second thickness greater than the first thickness in the one or more second portions 674A, 674B. Electrically conductive material may then be formed on the dielectric layer within the one or more second portions 674A, 674B. The dielectric layer may be formed from a wide variety of suitable materials and/or combinations of materials. In certain embodiments, the dielectric layer may be extruded or molded to have desired varying thicknesses. In other embodiments, portions of the dielectric layer may be folded over themselves in order to form a dielectric layer with varying thicknesses. In yet other embodiments, the dielectric layer may be selectively foamed in order to achieve varying thicknesses. Other suitable construction techniques may be utilized as desired in other embodiments.

Figure 6G:
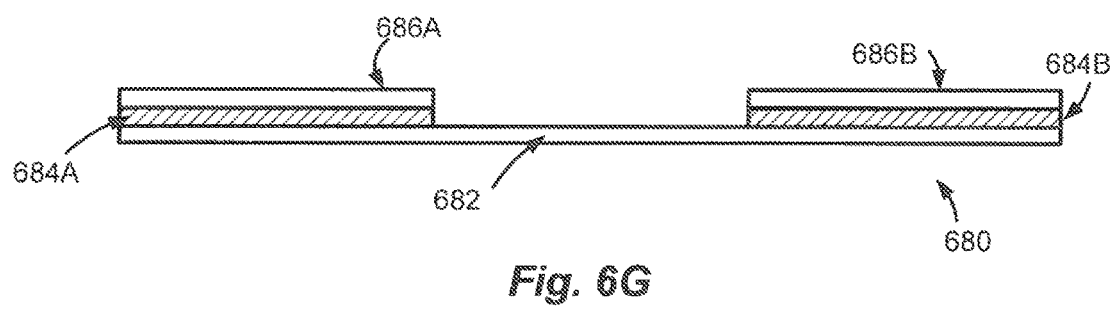
Figure 6H:
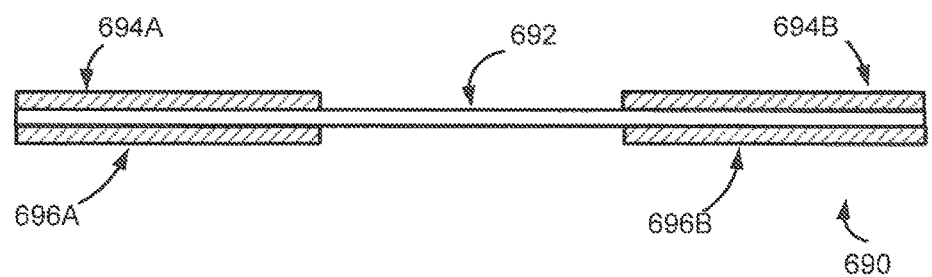

FIG. 6G illustrates another example tape or flexible structure 680 in which electrically conductive material is sandwiched between two suitable dielectric layers. As shown a first dielectric layer 682 may extend through a first portion and one or more second portions of the structure 680. Electrically conductive material 684A, 684B may then be formed on the first dielectric layer 680 within the one or more second portions. Respective second dielectric layers 686A, 686B may then be formed over the electrically conductive material 684A, 684B within the one or more second portions. FIG. 6H illustrates an example tape or flexible structure 690 in which electrically conductive material is formed on opposite sides of a dielectric layer 692. As shown, the dielectric layer 692 may extend through a first portion and one or more second portions of the structure 690. Electrically conductive material 694A, 694B may be formed on a first surface or side of the dielectric layer 692 within the one or more second portions. In certain embodiments, the electrically conductive material 694A, 694B may include discontinuous patches of material with spaces or gaps formed between adjacent patches. Additional electrically conductive material 696A, 696B may be formed on an opposite surface or side of the dielectric layer 692. For example, patches of electrically conductive material may be formed on an opposite side of the dielectric layer 692 to cover gaps between adjacent patches formed on the first side. A wide variety of other constructions may be utilized as desired to form a separator structure. Indeed, any number of dielectric, electrically conductive, and/or other layers may be utilized. The constructions illustrated in FIGS. 6A-6H are provided by way of example only. Additionally, in certain embodiments, certain layers and/or features may be combined and/or interchanged from two or more of the illustrated constructions in order to form a desired twisted pair separator construction.

As set forth above, a wide variety of different electrically conductive patch configurations may be utilized in conjunction with twisted pair separators, other shielding elements, and/or segments of shielding elements. FIGS. 7A-7D illustrate top level views of example tape or flexible structures that may be utilized to form twisted pair separators. Each example structure depicts electrically conductive material formed at or near opposing edge, which would correspond to the second portions of a twisted pair separator. It will be appreciated that similar patch configurations may be utilized in conjunction with separators that include different numbers of second portions. Additionally, similar patch configurations may be utilized in conjunction with other shielding elements, such as an overall shield or a separator positioned between two or more twisted pairs.

Figure 7A:
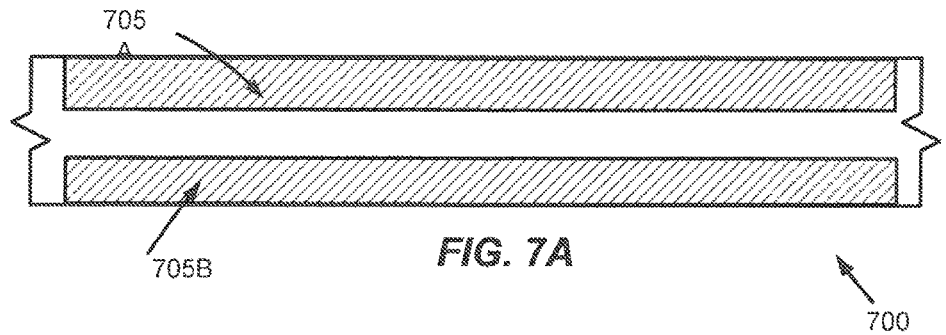
FIGS. 7A-7D are top level views of example tape or flexible structures that may be utilized to form twisted pair separators, according to illustrative embodiments of the disclosure.

With reference to FIG. 7A, a top level view of an example flexible structure 700 that may be utilized in the formation of a twisted pair separator is illustrated. The structure 700 may include relatively continuous electrically conductive patches 705A, 705B formed on a dielectric material in respective areas that may correspond to one or more second portions of a twisted pair separator. Each patch 705A, 705B may cover all or substantially all of a respective second portion region. As a result, the structure 700 may be utilized to form a twisted pair separator or segment of a twisted pair separator that functions as a relatively continuous shielding element.

Figure 7B:
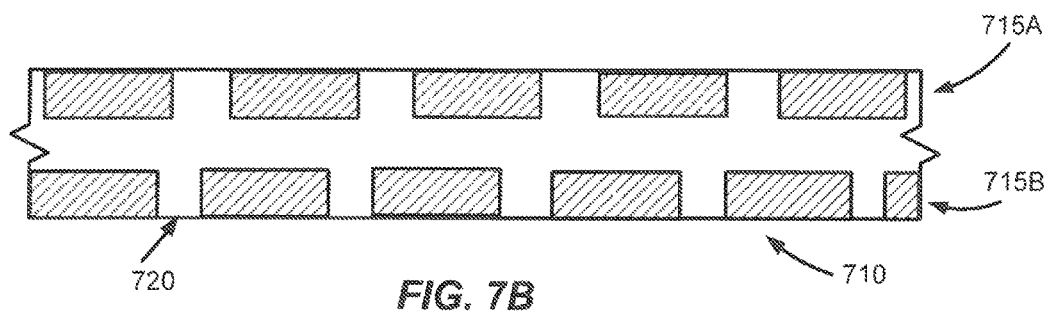

With reference to FIG. 7B, a top level view of another example flexible structure 710 that may be utilized in the formation of a twisted pair separator is illustrated. The structure 710 may include any number of rectangular patches of electrically conductive material, such as patches 715A, 715B formed on a dielectric material in respective areas that may correspond to one or more second portions of a separator. As desired in various embodiments, the patches 715A, 715B may include any desired lengths, and any desired gap 720 or separation distance may be provided between adjacent patches. In certain embodiments, the patches may be formed in accordance with a repeating pattern having a definite step or period. As desired, additional patches may be formed on an opposing side of the dielectric material to cover the gaps 720. Additionally, in certain embodiments, each patch 715A, 715B may have a width that is sufficient to form a shield that encapsulates a twisted pair when the one or more second portions are folded or wrapped around an outer periphery of the twisted pair conductors.

Figure 7C:
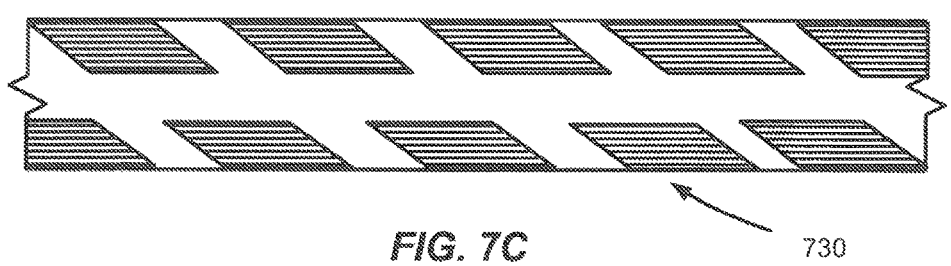

FIG. 7C illustrates a top level view of another example flexible structure 730 that may be utilized in the formation of a twisted pair separator. The flexible structure 730 may include any number of electrically conductive patches having the shape of a parallelogram. In other words, the patches may be formed at an angle within one or more areas of the structure 730 that correspond to one or more second portions of a separator. As shown, the patches may be formed at an acute angle with respect to the width dimension of the structure 730. In certain embodiments, the acute angle facilitates manufacturing and enhances patch-to-substrate adhesion. Additionally, the acute angle may also facilitate the covering of opposing isolating spaces or gaps. In certain embodiments, benefit may be achieved when the acute angle is about 45 degrees or less. In other embodiments, benefit is achieved when the acute angle is about 35 degrees or less, about 30 degrees or less, about 25 degrees or less, about 20 degrees or less, or about 15 degrees or less. In other embodiments, benefit is achieved when the acute angle is between about 12 and 40 degrees. In certain embodiments, the acute angle may be in a range between any two of the degree values provided in this paragraph.

Figure 7D:
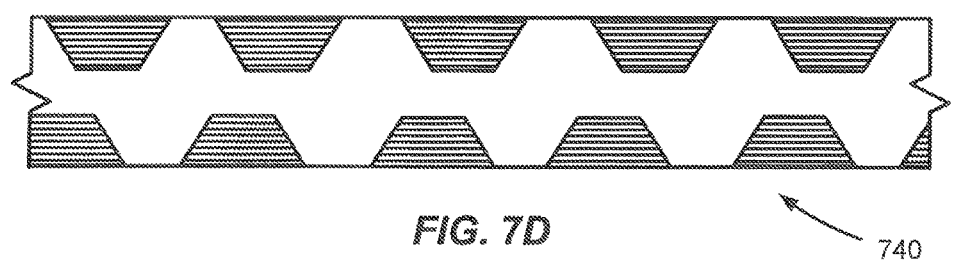

FIG. 7D illustrates a top level view of another example flexible structure 740 that may be utilized in the formation of a twisted pair separator. The structure 740 may include any number of electrically conductive patches having a trapezoidal shape. In certain embodiments, the orientation of adjacent trapezoidal patches may alternate. Similar to the patch pattern illustrated in FIG. 7C, the trapezoidal patches may provide manufacturing and/or shielding benefits. A wide variety of other suitable patch configurations may be utilized as desired in various embodiments.

As set forth above, in certain embodiments, one or more of the electrically conductive patches included in a shield element, such as a twisted pair separator, a shield, or a separator formed between two or more twisted pairs may be shorted in a circumferential direction or along a periphery of the shield element and/or any enclosed components. In other words, an electrically conductive patch may contact itself at the edges of a shield element. For example, if a twisted pair separator includes a single second portion (or a second portion that forms a double wrapped shield or other shield having a large overlap region) that is wrapped around the conductors of a twisted pair, at least one electrically conductive patch formed on the second portion may be brought into contact with itself. In the event that a twisted pair separator includes a plurality of second portions, in certain embodiments, electrically conductive material formed on second portions that contact one another may be electrically shorted together. In this regard, electrically conductive patches that are continuous around an outer periphery or circumference of the twisted pair separator may be formed.

Figure 8:
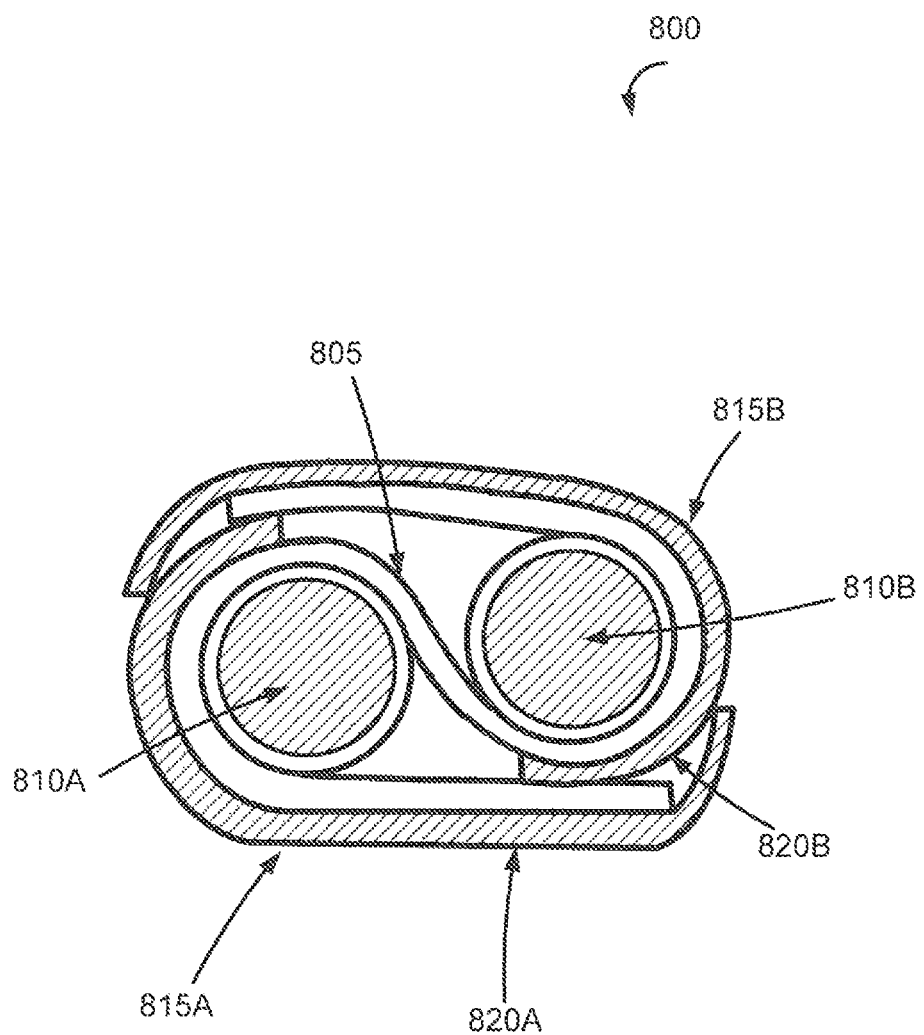
FIG. 8 is a cross-sectional view of an example twisted pair separator component in which electrically conductive material is shorted to itself in a circumferential direction, according to an illustrative embodiment of the disclosure.

FIG. 8 is a cross-sectional view of an example twisted pair separator 800 in which electrically conductive material is shorted to itself in a circumferential direction, according to an illustrative embodiment of the disclosure. As shown, the separator 800 may include a first portion 805 positioned between the two conductors 810A. 810B of a twisted pair. Respective second portions 815A, 815B may extend from either end of the first portion 805, and each second portion 815A, 815B may be wrapped around an outer periphery of the twisted pair conductors until it contacts the other second portion. Additionally, when a first second portion 815A is brought into contact with the other second portion 815B, the electrically conductive material 820A formed on the first second portion 815A may be brought into contact with the electrically conductive material 820B formed on the other second portion 820B. As shown, the electrically conductive material 820A may overhang its dielectric substrate layer at an edge of the first second portion 815A to facilitate contact with the electrically conductive material 820B of the other second portion 815B; however, a wide variety of other suitable techniques may be utilized to short the electrically conductive material. Additionally, as shown, the electrically conductive material formed on the other second portion may be brought into contact with the first second portion in a similar manner.

FIGS. 9A-9D are cross-sectional depictions of a few example techniques for circumferentially shorting electrically conductive material, according to illustrative embodiments of the disclosure. With reference to FIG. 9A, a first example contact region 900 (e.g., a contact region formed between two second portions of a twisted pair separator, an overlap region formed by a second portion with itself, an overlap region formed by another shield element, etc.) is illustrated. The illustrated contact region 900 is representative of a first shield element 905 (e.g., a first second portion, one end of a shielding element or second portion, etc.) being brought into contact with a second shield element 910 (e.g., another second portion, an opposite end of a shielding element or second portion, etc.). The first element 905 may include a first dielectric material 915, and one or more electrically conductive patches 920 may be formed on the first dielectric material 915. A fold 925 may be formed at or near an edge of the first element 905. In other words, the first element 905 may be folded over itself along an edge (e.g., an edge in the width direction) or along one or more portions of an edge (e.g., portions of an edge corresponding to electrically conductive patches). Accordingly, when the first element 905 is wrapped around one or more conductors (or twisted pairs, other cable components, etc.) and brought into contact with the second element 910 within an overlapping region, the electrically conductive material 920 at the edge of the first element 905 will be brought into contact with the electrically conductive material 930 on the second element 910.

FIG. 9B illustrates another example contact region 940 that may be representative of a first shield element 942 being brought into contact with a second shield element 944. The first element 942 may include a dielectric material 946, and one or more electrically conductive patches 948 may be formed on the dielectric material 946. Along an edge of the first element 942, an overhanging portion 950 may be formed in which electrically conductive patch material 948 extends beyond the dielectric material 946. A wide variety of suitable techniques may be utilized as desired to form the overhanging portion 950. For example, the dielectric material 946 may be removed from the edge (or a portion of the edge) of the first element 942. As another example, one or more electrically conductive patches 948 may be formed on or attached to the dielectric material 946 so as to overhang or extend beyond the edge (or one or more portions of the edge) of the dielectric material 946. Accordingly, when the first element 942 is wrapped around one or more conductors (or other cable components) and brought into contact with the second element 944 within an overlapping region, the electrically conductive material 948 at the edge of the first element 942 will be brought into contact with the electrically conductive material 952 on the second element 944.

FIG. 9C illustrates another example contact region 960 that may be representative of a first shield element 962 being brought into contact with a second shield element 964. The first element 962 may include a dielectric material 966, and one or more electrically conductive patches 968 may be formed on the dielectric material 966. Along an edge of the first element 962 (or at any other desired areas within an overlapping portion of the first and second elements 962, 964), one or more vias 970 (e.g., metallic or electrically conductive vias, etc.) may be provided in or through the dielectric material 966 to permit the electrically conductive material 968 formed on the first element 962 to contact electrically conductive material 972 formed on the second element 964. Although not specifically illustrated, in other embodiments, one or more gaps or holes may be formed in the dielectric material 966. Thus, when the first element 962 is wrapped around one or more conductors (or other cable components) and brought into contact with the second element 964 within an overlapping region, the electrically conductive material 968, 972 formed on the two elements 962, 964 may be brought into contact via the one or more gaps or holes.

FIG. 9D illustrates another example contact region 980 that may be representative of a first shield element 982 being brought into contact with a second shield element 984. The first element 982 may include a dielectric material 986, and one or more electrically conductive patches 988 may be formed on the dielectric material 986. A patch 988 may include an overlapping or double-sided portion 990 at an edge (or at one or more portions of the edge) of the first element 982. For example, the patch 988 may be folded over one edge of the dielectric material 986. As another example, the patch 988 may be formed on both sides of the dielectric material 986 along an edge (or at one or more portions of the edge) of the first element 982. In other words, at an edge of the first element 982, an electrically conductive patch 988 may be present on both sides of the dielectric material 986. Accordingly, when the first element 982 is wrapped around one or more conductors (or other cable components) and brought into contact with the second element 984 within an overlapping region, the electrically conductive material 988 at the edge of the first element 982 will be brought into contact with the electrically conductive material 992 on the second element 984.

As set forth above, in certain embodiments, a shield element may be formed to include a plurality of longitudinally overlapping segments, and each segment may include one or more discontinuous electrically conductive patches. For example, a twisted pair separator (e.g., one of the separators 120A-D illustrated in FIG. 1) may be formed from a plurality of longitudinally overlapping discrete segments. Similarly, a shield layer of separator positioned between two or more twisted pairs may be formed from a plurality of longitudinally overlapping discrete segments.

Figure 10:
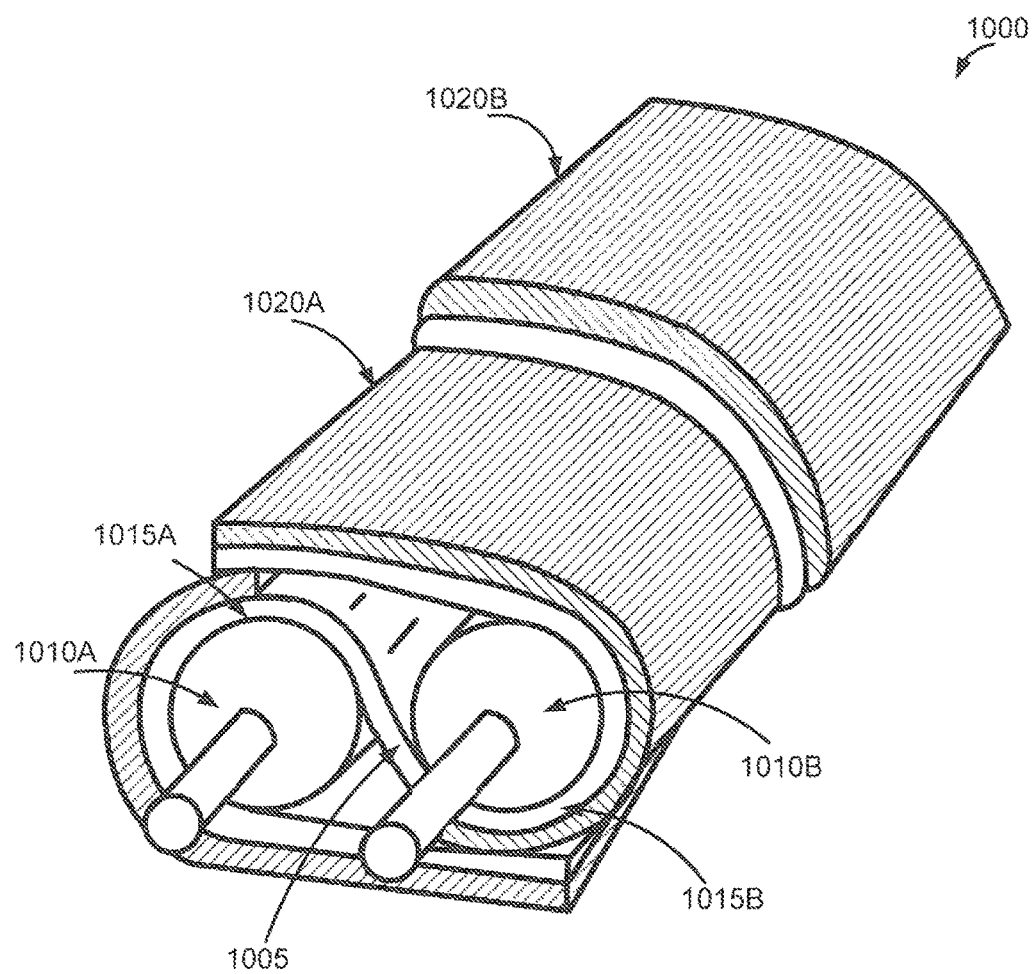
FIG. 10 is a perspective view of an example twisted pair separator component that includes a plurality of overlapping segments, according to an illustrative embodiment of the disclosure.
Figure 11:
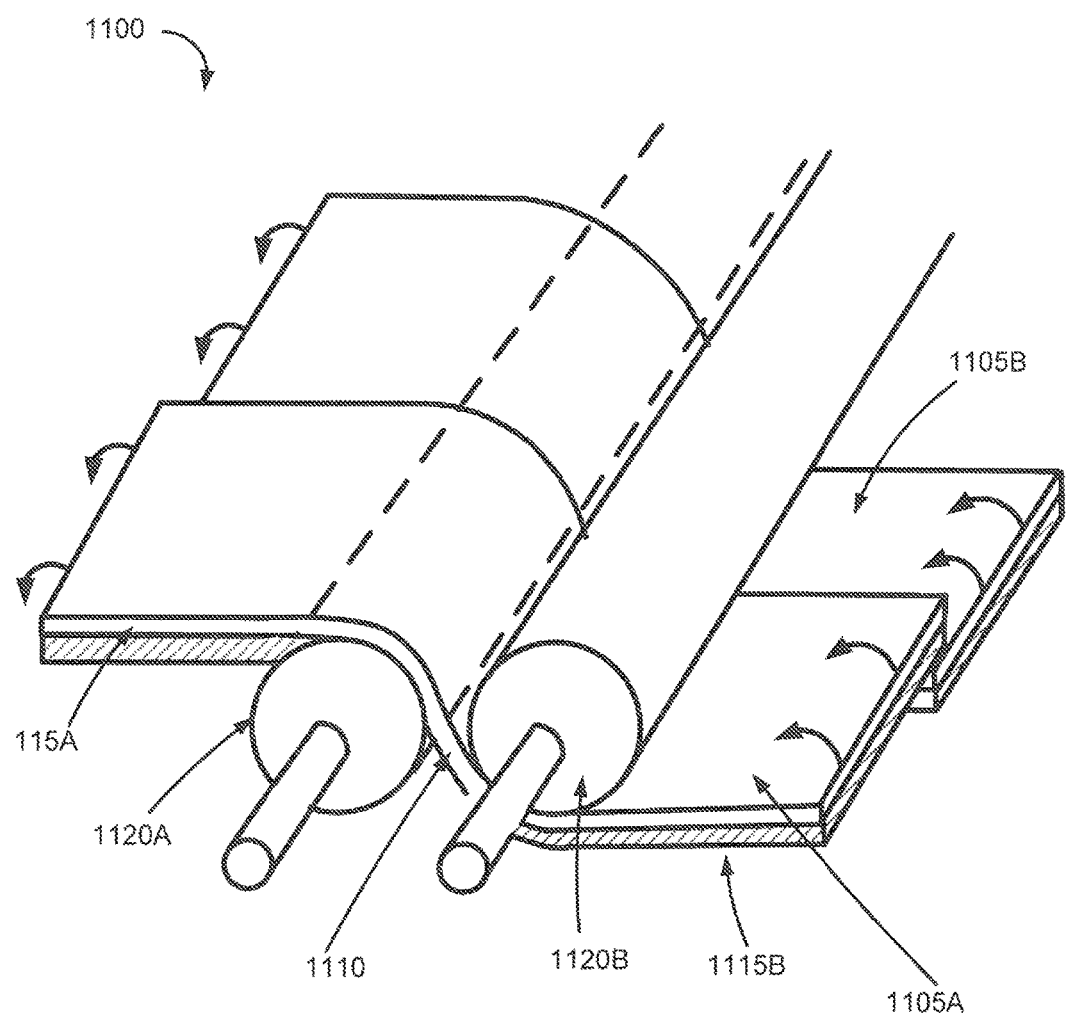
FIG. 11 is another perspective view of an example twisted pair separator component that includes a plurality of overlapping segments, according to an illustrative embodiment of the disclosure.

FIG. 10 is a perspective view of an example twisted pair separator 1000 that includes a plurality of overlapping segments, according to an illustrative embodiment of the disclosure. In certain embodiments, the separator 1000 may include components similar to any of the separators illustrated and discussed above with reference to FIGS. 3A-5F. In other embodiments, the separator 1000 may be formed with a different suitable construction. With reference to FIG. 10, the separator 1000 may include a first portion 1005 positioned between the two conductors 1010A, 1010B of a twisted pair. Additionally, one or more second portions may extend from the first portion 1005, and the one or more second portions may be wrapped around an outer periphery of the twisted pair conductors. As shown, two second portions 1015A, 1015B may respectively extend from opposite ends of the first portion 1005. Each second portion 1015A, 1015B may include electrically conductive material that functions as a twisted pair shield when the second portions 1015A, 1015B are wrapped around the twisted pair conductors.

According to an aspect of the disclosure, the separator 1000 may be formed from a plurality of longitudinally extending discrete segments, such as segments 1020A and 1020B. Each segment 1020A, 1020B may include one or more patches of electrically conductive material, such as metallic patches formed on a suitable carrier or substrate layer. Further, an overlap may be formed between each adjacent segment 1020A, 1020B. For example, a first separator segment 1020A incorporated into a twisted pair may include a first end and a second end along a longitudinal direction of a cable. A second separator segment 1020B may be incorporated into the twisted pair, and the second separator segment 1020B may also include a first end and a second end. The first end of the second separator segment 1020B may overlap the second end of the first separator segment 1020B. As desired, a third separator segment may also be incorporated into the twisted pair, and a first end of the third separator segment may overlap the second end of the second shield segment 1020B. Any number of other separator segments may be incorporated into the separator 1000 in a similar manner. Additionally, other segment overlapping configurations may be utilized as desired in various embodiments. For example, both a first segment and a third segment may overlap a second segment. Indeed, a wide variety of overlapping configurations are possible and will be appreciated by those of ordinary skill in the art.

In certain embodiments, a twisted pair separator, such as the separator 1000 illustrated in FIG. 10, may be formed from a plurality of overlapping segments prior to the separator 1000 being incorporated into a twisted pair. For example, individual segments may be combined in an overlapping fashion, and the resulting twisted pair separator may then be incorporated into a twisted pair during cable construction. In other embodiments, individual separator segments may be separately incorporated into a twisted pair during cable construction. Additionally, a wide variety of suitable techniques may be utilized as desired to incorporate a twisted pair separator into a twisted pair. FIG. 1100 illustrates one example technique for incorporating a twisted pair separator 1100 into a twisted pair. Although the separator 1100 of FIG. 1100 is illustrated as a discontinuous separator formed from a plurality of overlapping segments, similar techniques may be utilized in conjunctions with other twisted pair separator constructions, such as any of the constructions illustrated in FIGS. 3A-5F.

With reference to FIG. 1100, the separator 1100 may be formed from a plurality of overlapping segments, such as segments 1105A and 1105B. Each segment (generally referred to as segment 1105) may include a first portion 1110 and one or more second portions may extend from the first portion 1110. As shown, respective second portions 1115A, 1115B may extend from opposite lateral edges of the first portion 1110. The separator 1100 may be inserted between the two conductors 1120A, 1120B of a twisted pair such that the first portion 1110 is positioned between the two conductors 1120A, 1120B. Both the separator 1100 and the conductors 1120A, 1120B may extend in a longitudinal direction. In certain embodiments, the separator 1100 may be positioned such that an approximately center point of the first portion 1110 along a lateral direction is positioned between the two conductors. For example, the center point may be positioned along a line that runs through the center points of each of the conductors 1120A, 1120B.

Once positioned between the conductors 1120A, 1120B, each of the second portions 1115A, 1115B of the separator 1100 may be wrapped around an outer periphery or an outer circumference of the twisted pair. In certain embodiments, each of the second portions 1115A, 1115B may be wrapped in a common direction. As shown, each of the second portions 1115A, 1115B may be wrapped in a counterclockwise direction. In other embodiments and/or separator configurations, the second portions 1115A, 1115B may be wrapped in a clockwise direction. In yet other configurations, it is even possible that two or more second portions are wrapped in opposite directions.

During wrapping, a distal edge of a second portion (i.e., an edge of the second portion along a lateral direction opposite the edge in contact with the first portion) may be brought over or around one or more of the twisted pair conductors 1120A, 1120B until it contacts another second portion (or itself in other separator configurations). As a result, the conductors 1120A, 1120B may be encased or wrapped in a shield layer formed by the electrically conductive material incorporated into the second portions 1115A, 115B. In an example embodiment, the wrapping motion can be characterized as folding or curling a second portion around an outer periphery or circumference of a twisted pair. Additionally, as desired, electrically conductive material formed on the one or more second portions may be shorted together along an outer periphery of the twisted pair or along a circumferential direction around the twisted pair.

In certain embodiments, one or more second portions 1115A, 1115B may be wrapped around the twisted pair conductors 1120A, 1120B without substantially spiraling the second portions 1115A, 1115B and electrically conductive material formed thereon around or about the twisted pair conductors 1120A, 1120B. Alternatively, one or more second portions 1115A, 1115B may be wrapped so as to spiral around the conductors 1120A, 1120B. Additionally, in certain embodiments, the conductive patches included in a second portion may face away from the conductors 1120A, 1120B, towards the exterior of a cable. In other embodiments, the conductive patches may face inward, towards the conductors 1120A, 1120B. In yet other embodiments, conductive patches may be formed on both sides of a second portion.

In one example embodiment, a twisted pair separator 1100 and twisted pair conductors 1120A, 1120B may be continuously fed from reels, bins, containers, or other bulk storage facilities. The twisted pair separator 1100 and the conductors 1120A, 1120B may be fed such that a first portion 1110 of the twisted pair separator is positioned between the two conductors 1120A, 1120B. The conductors 1120A, 1120B and the separator 1100 may then be fed through one or more suitable narrowing chutes, funnels, or other suitable devices that curl the second portions 1115A, 1115B of the separator 1100 around the conductors 1120A, 1120B. As desired, one or more suitable devices may apply an adhesive or mechanical fasteners to one or more second portions 1115A, 1115B. For example, an adhesive material may be applied to a second portion 1115A to facilitate attachment of the second portion to the other second portion 1115B. Further, one or more suitable twining devices may twist the conductors 1120A, 1120B and the separator 1100 together. Downstream from the mechanism(s) that feed and twist the twisted pair components, other devices may combine the twisted pair with other cable components and extrude a polymeric jacket, skin, casing, or sheath over the cable components, thus providing the basic architecture depicted in FIGS. 1-2 and discussed above.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cable comprising:
    a twisted pair of individually insulated conductors;
    a separator comprising a dielectric portion consisting of one or more dielectric materials and positioned between the conductors of the twisted pair and at least one shielding portion comprising electrically conductive material and extending from the dielectric portion to form a shield around an outer circumference of the twisted pair; and
    a jacket formed around the twisted pair and the separator.

2. The cable of claim 1, wherein the at least one shielding portion comprises a first shielding portion extending from a first edge of the dielectric portion and a second shielding portion extending from a second edge of the dielectric portion.

3. The cable of claim 2, wherein the first shielding portion and the second shielding portion contact one another when wrapped around the outer circumference of the twisted pair.

4. The cable of claim 1, wherein the separator comprises a dielectric layer extending through the dielectric portion and the at least one shielding portion.

5. The cable of claim 1, wherein the dielectric portion is formed from a first material and the at least one shielding portion comprises a base layer formed from a second material different from the first material.

6. The cable of claim 1, wherein the dielectric portion comprises a first thickness and the at least one shielding portion comprises a second thickness greater than the first thickness.

7. The cable of claim 1, further comprising one or more elements extending from the at least one shielding portion to maintain a separation distance between the electrically conductive material and the conductors of the twisted pair.

8. The cable of claim 1, wherein the electrically conductive material comprises a plurality of longitudinally spaced discrete patches of electrically conductive material with longitudinally spaced gaps respectively formed between adjacent patches.

9. The cable of claim 1, wherein the electrically conductive material is shorted to itself in a circumferential direction when the shield is formed around the outer circumference of the twisted pair.

10. The cable of claim 1, wherein the separator comprises a plurality of discrete segments positioned along a longitudinal length of the cable, and wherein a respective overlap is formed between adjacent segments.

11. A cable, comprising:
    a pair of individually insulated conductors that are twisted together along a longitudinal direction of the cable;
    a dielectric film positioned between and wrapped around the pair of conductors, the dielectric film comprising (i) a first portion positioned between the pair of conductors, wherein electrically conductive material is not formed on the first portion, and (ii) at least one second portion wrapped around the pair of conductors, wherein electrically conductive material is formed on the at least one second portion to form a shield around the pair of conductors; and a jacket formed around the pair of conductors and the dielectric film.

12. The cable of claim 11, wherein the at least one second portion comprises a single second portion extending from a longitudinally extending edge of the first portion.

13. The cable of claim 12, wherein the at least one second portion comprises a plurality of portions extending from the first portion.

14. The cable of claim 12, wherein the first portion comprises a first thickness and the at least one second portion comprises a second thickness greater than the first thickness.

15. The cable of claim 11, further comprising one or more elements extending from the dielectric film to maintain a separation distance between the electrically conductive material and the pair or conductors.

16. The cable of claim 11, wherein the electrically conductive material comprises a plurality of longitudinally spaced discrete patches of electrically conductive material with longitudinally spaced gaps respectively formed between adjacent patches.

17. The cable of claim 11, wherein the electrically conductive material is shorted to itself in a circumferential direction when the dielectric film is wrapped around the pair of conductors.

18. The cable of claim 11, wherein the dielectric film comprises a plurality of discrete segments positioned along a longitudinal length of the cable, and wherein a respective overlap is formed between adjacent segments.

19. An insulator for use with a first wire and a second wire that form a longitudinally extending twisted wire pair, the insulator comprising:

a dielectric portion consisting of one or more dielectric materials, the dielectric portion positioned between the first wire and the second wire and extending in the longitudinal direction; and one or more shield portions comprising electrically conductive material, the one or more shield portions extending from the dielectric portion and wrapped around an outer circumference of the twisted wire pair to form a shield.

20. The insulator of claim 19, wherein the dielectric portion is formed from a first material and the one or more shield portions comprise a base layer formed from a second material different from the first material.

* * * * *